(12) United States Patent
Aoyama et al.

(10) Patent No.: US 9,910,530 B2
(45) Date of Patent: Mar. 6, 2018

(54) DISPLAY PANEL WITH TOUCH DETECTION FUNCTION

(71) Applicants: Panasonic Liquid Crystal Display Co., Ltd., Hyogo (JP); Panasonic Corporation, Osaka (JP)

(72) Inventors: Toshiyuki Aoyama, Osaka (JP); Tetsuo Fukami, Hyogo (JP); Daisuke Kajita, Hyogo (JP); Kazushige Takagi, Osaka (JP)

(73) Assignees: PANASONIC LIQUID CRYSTAL DISPLAY CO., LTD., Hyogo (JP); PANASONIC CORPORATION, Osala (JP)

( * ) Notice: Subject to any disclaimer, the term of this patent is extended or adjusted under 35 U.S.C. 154(b) by 67 days.

(21) Appl. No.: 14/681,115

(22) Filed: Apr. 8, 2015

(65) Prior Publication Data
US 2016/0253023 A1    Sep. 1, 2016

Related U.S. Application Data

(60) Provisional application No. 62/121,515, filed on Feb. 27, 2015.

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/047* (2013.01); *G06F 3/0412* (2013.01);
(Continued)

(58) Field of Classification Search
CPC . G06F 2203/04103; G06F 2203/04111; G06F 2203/04112; G06F 3/0416; G06F 3/044; G06F 3/047; G06F 3/0412
See application file for complete search history.

(56) References Cited

U.S. PATENT DOCUMENTS 5,519,521 A *  5/1996  Okimoto ............... G02F 1/1368
                                                        349/42
7,851,804 B2 * 12/2010  Takahashi ............ G09G 3/3291
                                                        257/59
(Continued)

FOREIGN PATENT DOCUMENTS

JP  2010-039380 A   2/2010
JP  2010-152864 A   7/2010
JP  2013-257863 A  12/2013

*Primary Examiner* — Michael J Jansen, II
(74) *Attorney, Agent, or Firm* — Hubbs, Enatsky & Inoue PLLC

(57) ABSTRACT

Provided is a display panel including: a plurality of pixel electrodes divided into a plurality of groups; and a plurality of common electrodes arranged at a ratio of one to a plurality of pixel electrodes included in one of the plurality of groups. Each of a plurality of sensor electrode lines overlaps with corresponding one of a plurality of data signal lines in plan view. The plurality of sensor electrode lines and each of the plurality of common electrodes overlap each other in plan view. The each of the plurality of common electrodes is electrically connected to the plurality of sensor electrode lines. At least one insulating film is formed between each of a region between the data signal lines and the sensor electrode lines, a region between the sensor electrode lines and the common electrodes, and a region between the common electrodes and the pixel electrodes.

8 Claims, 21 Drawing Sheets

(51) Int. Cl.
  *G06F 3/044* (2006.01)
  *G06F 3/047* (2006.01)
(52) U.S. Cl.
  CPC .............. *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 8,477,251 B2* | 7/2013 | Lee | G02F 1/13338 349/110 |
| 8,654,092 B2* | 2/2014 | Moriwaki | G02F 1/136286 345/173 |
| 8,766,950 B1 | 7/2014 | Morein et al. | |
| 9,244,581 B2* | 1/2016 | Morein | G06F 3/0412 |
| 9,389,737 B2* | 7/2016 | Lee | G06F 3/044 |
| 2003/0156079 A1* | 8/2003 | Nakanishi | G09G 3/3233 345/45 |
| 2004/0164943 A1* | 8/2004 | Ogawa | G09G 3/3655 345/92 |
| 2008/0239214 A1 | 10/2008 | Lee et al. | |
| 2010/0033448 A1 | 2/2010 | Koito et al. | |
| 2010/0156819 A1 | 6/2010 | Takahashi et al. | |
| 2010/0193257 A1* | 8/2010 | Hotelling | G06F 3/0412 178/18.06 |
| 2010/0194697 A1* | 8/2010 | Hotelling | G06F 3/0412 345/173 |
| 2011/0291977 A1* | 12/2011 | Moriwaki | G02F 1/136286 345/173 |
| 2012/0086654 A1* | 4/2012 | Song | G06F 3/0412 345/173 |
| 2012/0218199 A1* | 8/2012 | Kim | G06F 3/0412 345/173 |
| 2012/0313881 A1* | 12/2012 | Ge | G02F 1/13338 345/174 |
| 2013/0162570 A1* | 6/2013 | Shin | G06F 3/041 345/173 |
| 2013/0308073 A1 | 11/2013 | Yamazaki et al. | |
| 2013/0314074 A1* | 11/2013 | Takahashi | G01R 1/36 324/110 |
| 2015/0091850 A1* | 4/2015 | Morein | G06F 3/0412 345/174 |
| 2015/0103048 A1* | 4/2015 | Nakayama | G06F 3/044 345/174 |
| 2015/0200213 A1 | 7/2015 | Yamazaki et al. | |
| 2015/0286317 A1* | 10/2015 | Shepelev | G06F 3/0416 345/174 |
| 2016/0062164 A1 | 3/2016 | Chae et al. | |
| 2016/0109986 A1* | 4/2016 | Morein | G06F 3/0412 345/174 |
| 2016/0188063 A1* | 6/2016 | Kim | G06F 3/0412 345/173 |
| 2016/0253023 A1* | 9/2016 | Aoyama | G06F 3/0416 345/174 |
| 2016/0253024 A1* | 9/2016 | Aoyama | G06F 3/044 |
| 2016/0378254 A1 | 12/2016 | Wang et al. | |

* cited by examiner

Related Art

DISPLAY PANEL WITH TOUCH DETECTION FUNCTION

CROSS REFERENCE TO RELATED APPLICATIONS

The present application claims priority to Provisional application No. 62/121,515 filed on Feb. 27, 2015.

BACKGROUND

1. Field of the Invention

The present application relates to a display panel with touch detection function.

2. Description of the Related Art

Hitherto, various display devices with touch panels have been proposed. In recent years, in order to reduce the thickness of the entire display device, there has been proposed a so-called in-cell display device with touch detection function, which incorporates a function of a touch panel inside a display panel. The above-mentioned display device is disclosed in, for example, U.S. Pat. No. 8,766,950. Further, in the above-mentioned publication, there is disclosed an in-plane switching (IPS) display panel that is excellent in wide viewing angle characteristics.

SUMMARY

However, in the technology disclosed in the above-mentioned publication, the following two problems mainly arise. The first problem resides in that a pixel aperture ratio is reduced. FIG. 29 is a plan view of a display panel disclosed in the above-mentioned publication. As illustrated in FIG. 29, when a sensor electrode line 706 is formed adjacent to a source line 704, the sensor electrode line 706 is arranged in a pixel aperture region. In this case, the pixel aperture ratio is reduced, and the display quality is remarkably reduced. The second problem resides in that the detection accuracy of the touch position is reduced. When the sensor electrode line 706 is formed close to a gate line 702, a parasitic capacitance formed between the sensor electrode line 706 and the gate line 702 is increased. In this case, due to the influence of the above-mentioned parasitic capacitance, the detection accuracy of the touch position is remarkably reduced.

The present application has been made in view of the above-mentioned problems, and has an object to provide a display panel with touch detection function, which is high in pixel aperture ratio and excellent in detection accuracy of the touch position.

In order to solve the problems described above, according to one embodiment of the present application, there is provided a display panel, including: a plurality of gate signal lines extending in a first direction; a plurality of data signal lines and a plurality of sensor electrode lines, which extend in a second direction different from the first direction; a plurality of pixel electrodes arranged so as to respectively correspond to a plurality of pixels arrayed in the first direction and the second direction, the plurality of pixel electrodes being divided into a plurality of groups; and a plurality of common electrodes arranged at a ratio of one to a plurality of pixel electrodes included in one of the plurality of groups, in which: each of the plurality of sensor electrode lines overlaps with corresponding one of the plurality of data signal lines in plan view; at least two of the plurality of sensor electrode lines and each of the plurality of common electrodes overlap each other in plan view, and the each of the plurality of common electrodes is electrically connected to at least one of the at least two of the plurality of sensor electrode lines overlapping with the each of the plurality of common electrodes; and at least one insulating film is formed between each of a region between the plurality of data signal lines and the plurality of sensor electrode lines, a region between the plurality of sensor electrode lines and the plurality of common electrodes, and a region between the plurality of common electrodes and the plurality of pixel electrodes.

In the display panel according to one embodiment of the present application, the plurality of common electrodes may be arrayed at equal intervals in the first direction and the second direction.

In the display panel according to one embodiment of the present application, the each of the plurality of common electrodes may be electrically connected to at least one of the plurality of sensor electrode lines via a through hole formed through the at least one insulating film formed in the region between the plurality of sensor electrode lines and the plurality of common electrodes.

In the display panel according to one embodiment of the present application, the plurality of data signal lines may be formed on a first insulating film formed so as to cover the plurality of gate signal lines. A second insulating film may be formed between the plurality of data signal lines and the plurality of sensor electrode lines so as to cover the plurality of data signal lines. A third insulating film may be formed on the second insulating film. The plurality of common electrodes may be formed on the third insulating film. A fourth insulating film may be formed between the plurality of sensor electrode lines and the plurality of common electrodes so as to cover the plurality of common electrodes. The plurality of sensor electrode lines may be formed on the fourth insulating film. A fifth insulating film may be formed between the plurality of common electrodes and the plurality of pixel electrodes so as to cover the plurality of sensor electrode lines. The plurality of pixel electrodes may be formed on the fifth insulating film. The fourth insulating film may have a through hole formed in a part thereof so as to electrically connect the each of the plurality of sensor electrode lines and corresponding one of the plurality of common electrodes to each other.

In the display panel according to one embodiment of the present application, the plurality of data signal lines may be formed on a first insulating film formed so as to cover the plurality of gate signal lines. A second insulating film may be formed between the plurality of data signal lines and the plurality of sensor electrode lines so as to cover the plurality of data signal lines. A third insulating film may be formed on the second insulating film. The plurality of sensor electrode lines may be formed on the third insulating film. A fourth insulating film may be formed between the plurality of sensor electrode lines and the plurality of common electrodes so as to cover the plurality of sensor electrode lines. The plurality of common electrodes may be formed on the fourth insulating film. A fifth insulating film may be formed between the plurality of common electrodes and the plurality of pixel electrodes so as to cover the plurality of common electrodes. The plurality of pixel electrodes may be formed on the fifth insulating film. The fourth insulating film may have a through hole formed in a part thereof so as to electrically connect the each of the plurality of sensor electrode lines and corresponding one of the plurality of common electrodes to each other.

In the display panel according to one embodiment of the present application, an adhesion layer may be formed between the third insulating film and the each of the plurality of sensor electrode lines.

In the display panel according to one embodiment of the present application, the plurality of data signal lines and the plurality of pixel electrodes may be formed on a first insulating film formed so as to cover the plurality of gate signal lines. A second insulating film may be formed between the plurality of data signal lines and the plurality of sensor electrode lines so as to cover the plurality of data signal lines and the plurality of pixel electrodes. The plurality of sensor electrode lines may be formed on the second insulating film. A third insulating film may be formed between the plurality of sensor electrode lines and the plurality of common electrodes so as to cover the plurality of sensor electrode lines. The plurality of common electrodes may be formed on the third insulating film. The third insulating film may have a through hole formed in a part thereof so as to electrically connect the each of the plurality of sensor electrode lines and corresponding one of the plurality of common electrodes to each other.

In the display panel according to one embodiment of the present application, an adhesion layer may be formed between the second insulating film and the each of the plurality of sensor electrode lines.

In the display panel according to one embodiment of the present application, the plurality of data signal lines and the plurality of pixel electrodes may be formed on a first insulating film formed so as to cover the plurality of gate signal lines. A second insulating film may be formed between the plurality of data signal lines and the plurality of sensor electrode lines so as to cover the plurality of data signal lines and the plurality of pixel electrodes. The plurality of common electrodes may be formed on the second insulating film. A third insulating film may be formed between the plurality of sensor electrode lines and the plurality of common electrodes so as to cover the plurality of common electrodes. The plurality of sensor electrode lines may be formed on the third insulating film. The third insulating film may have a through hole formed in a part thereof so as to electrically connect the each of the plurality of sensor electrode lines and corresponding one of the plurality of common electrodes to each other.

In the display panel according to one embodiment of the present application, the at least one insulating film may be made of an organic material.

In the display panel according to one embodiment of the present application, shielding wiring may be arranged so as to cover a gap between adjacent two of the plurality of common electrodes in plan view.

In the display panel according to one embodiment of the present application, the plurality of common electrodes may be arranged so that a gap between adjacent two of the plurality of common electrodes overlaps with a gap between adjacent pixels in plan view.

In the display panel according to one embodiment of the present application, the plurality of common electrodes may be arranged so that a gap between adjacent two of the plurality of common electrodes is positioned close to a center of a pixel region in plan view.

In the display panel according to one embodiment of the present application, a number of the sensor electrode lines to be electrically connected to corresponding one of the plurality of common electrodes, which is arranged on a side closer to a first drive circuit for outputting a sensor voltage, may be smaller than a number of the sensor electrode lines to be electrically connected to corresponding one of the plurality of common electrodes, which is arranged on a side farther from the first drive circuit.

DETAILED DESCRIPTION

Figure 1:
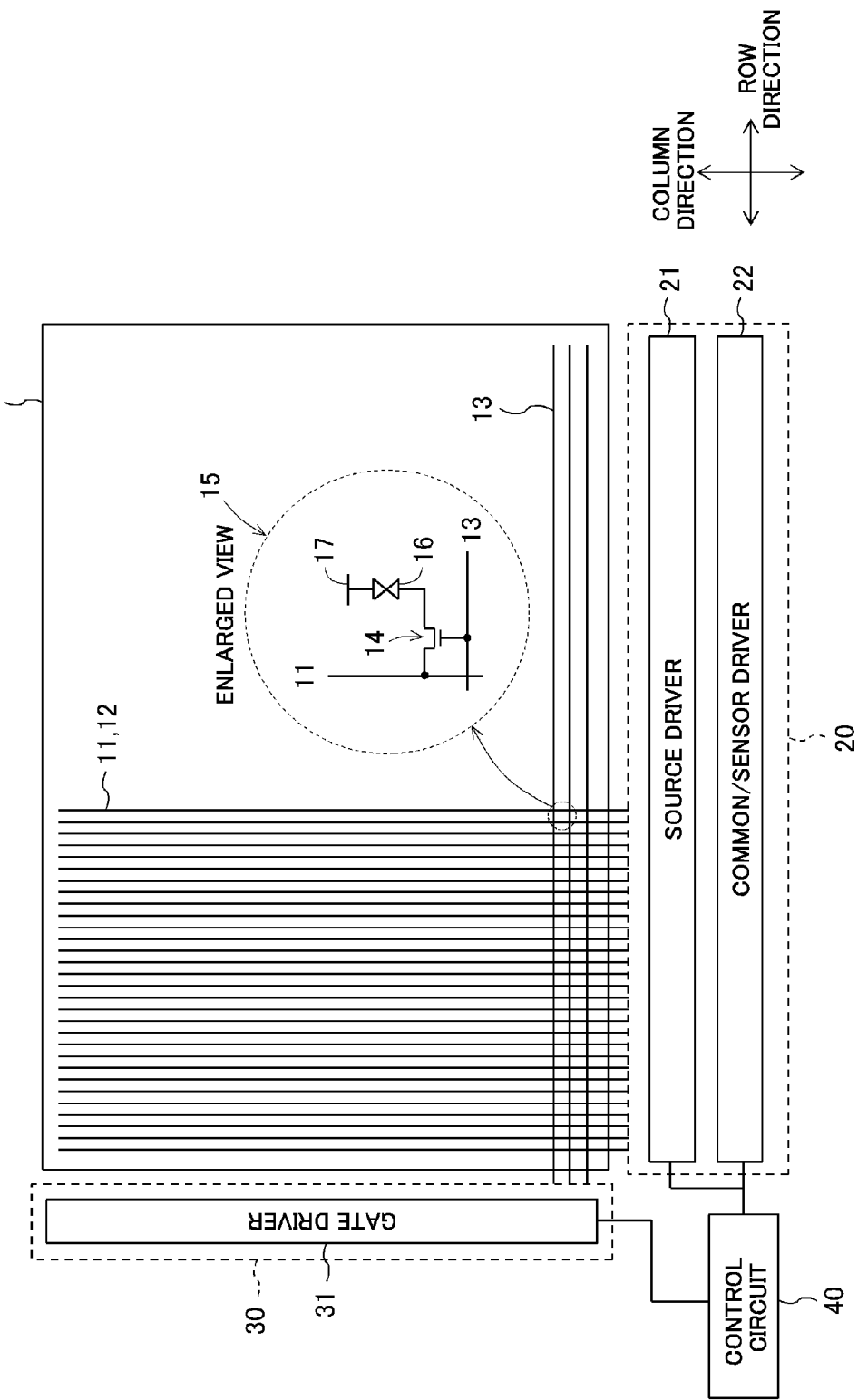
FIG. 1 is a plan view for illustrating a schematic configuration of a liquid crystal display device according to an embodiment of the present application.

One embodiment of the present application is described below with reference to the attached drawings. FIG. 1 is a plan view for illustrating a schematic configuration of a liquid crystal display device according to this embodiment. A liquid crystal display device 100 includes a display panel 10, a first drive circuit 20, a second drive circuit 30, a control circuit 40, a power supply section (not shown), and a backlight unit (not shown). The first drive circuit 20 and the second drive circuit 30 may be included in the display panel 10.

The display panel 10 includes a plurality of data signal lines 11 extending in a column direction, a plurality of sensor electrode lines 12 extending in the column direction, and a plurality of gate signal lines 13 extending in a row direction. The plurality of data signal lines 11 are arranged at substantially equal intervals in the row direction, the plurality of sensor electrode lines 12 are arranged at substantially equal intervals in the row direction, and the plurality of gate signal lines 13 are arranged at substantially equal intervals in the column direction. The respective sensor electrode lines 12 are arranged so as to overlap with the respective data signal lines 11 in plan view. In each intersecting portion between each data signal line 11 and each gate signal line 13, a thin film transistor 14 (TFT) is formed.

The first drive circuit 20 includes a source driver 21 for outputting a data signal (display voltage) to each of the data signal lines 11, and a common/sensor driver 22 for outputting a common voltage Vcom and a sensor voltage to each of the sensor electrode lines 12. The source driver 21 and the common/sensor driver 22 may be formed of a single integrated circuit (IC), or may be formed of two ICs independent of each other. The second drive circuit 30 includes a gate driver 31 for outputting a gate signal (scanning signal) to each of the gate signal lines 13.

In the display panel 10, a plurality of pixels 15 are arranged in matrix (in row direction and column direction) to correspond to each intersecting portion between each data signal line 11 and each gate signal line 13. Although the details are described later, the display panel 10 includes a thin film transistor substrate (TFT substrate), a color filter substrate (CF substrate), and a liquid crystal layer sandwiched between both the substrates. In the TFT substrate, pixel electrodes 16 are arranged to correspond to respective pixels 15. Further, the TFT substrate includes common electrodes 17 arranged at a ratio of one to a plurality of pixels 15. Each common electrode 17 has a function as an electrode for displaying an image, and a function as an electrode for detecting a touch position (sensor electrode). That is, the display panel 10 has an image display function and a touch detection function.

Figure 2:
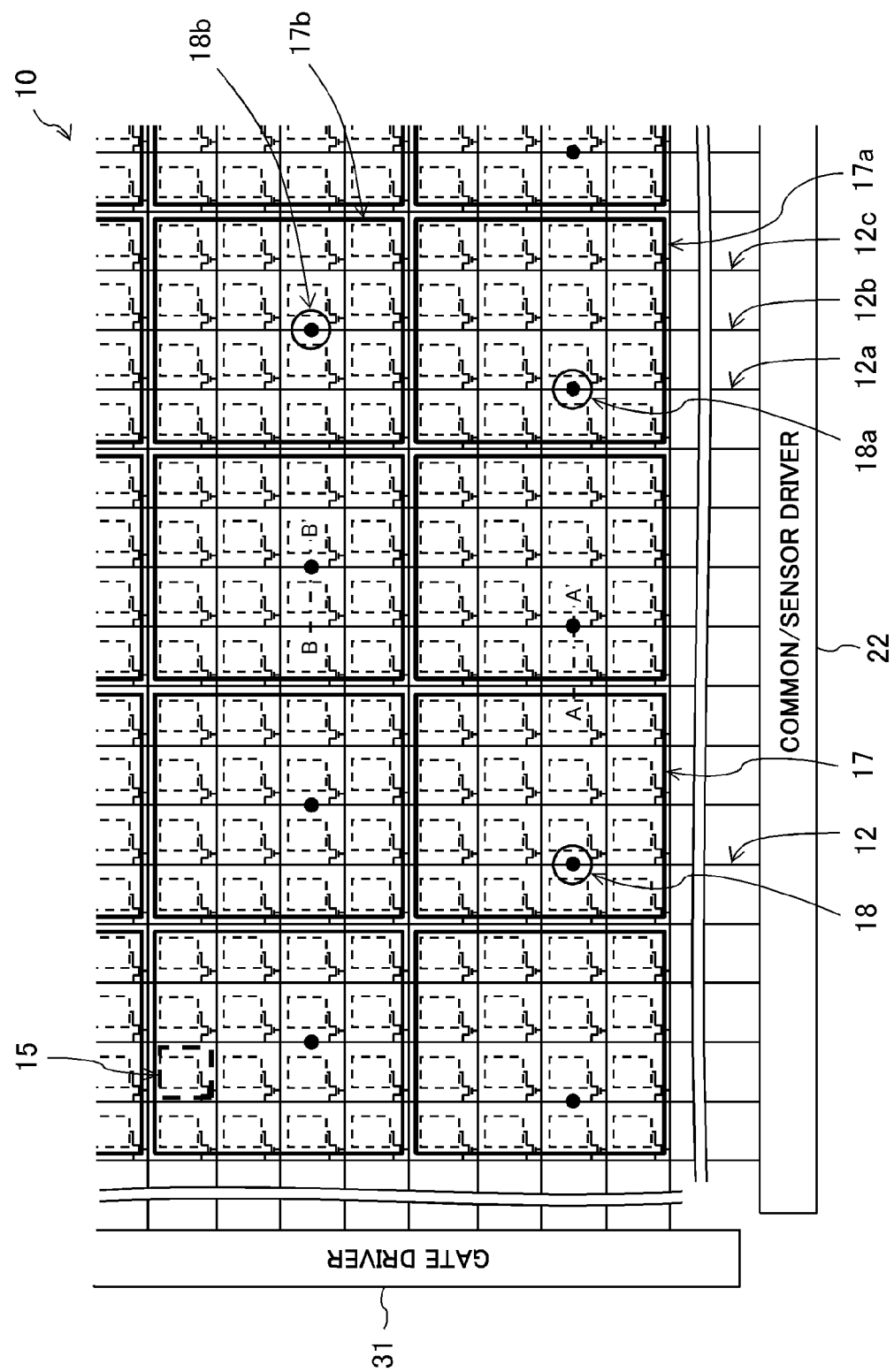
FIG. 2 is a plan view for illustrating details of a configuration example of a display panel according to the embodiment of the present application.

FIG. 2 is a plan view for illustrating details of a configuration example of the display panel 10. In FIG. 2, for the sake of easy understanding of the description, the source driver 21 and the data signal lines 11, which overlap with the sensor electrode lines 12 in plan view, are omitted. In the configuration illustrated in FIG. 2, the plurality of common electrodes 17 are arranged at a ratio of one to a total of sixteen pixels 15 including four pixels 15 in the column direction and four pixels 15 in the row direction. The plurality of common electrodes 17 each have the substantially same shape, and are arrayed regularly. The sensor electrode lines 12 are arranged in the TFT substrate so as to overlap with the respective data signal lines 11 (not shown) in plan view. In plan view, each of the common electrodes 17 overlaps with a plurality of sensor electrode lines 12, and is electrically connected to one of the plurality of sensor electrode lines 12 via a through hole 18. In the configuration illustrated in FIG. 2, a common electrode 17a overlaps with three sensor electrode lines 12a, 12b, and 12c, and is electrically connected to one sensor electrode line 12a among those sensor electrode lines via a through hole 18a. Further, a common electrode 17b overlaps with the three sensor electrode lines 12a, 12b, and 12c, and is electrically connected to one sensor electrode line 12b among those sensor electrode lines via a through hole 18b.

Figure 3:
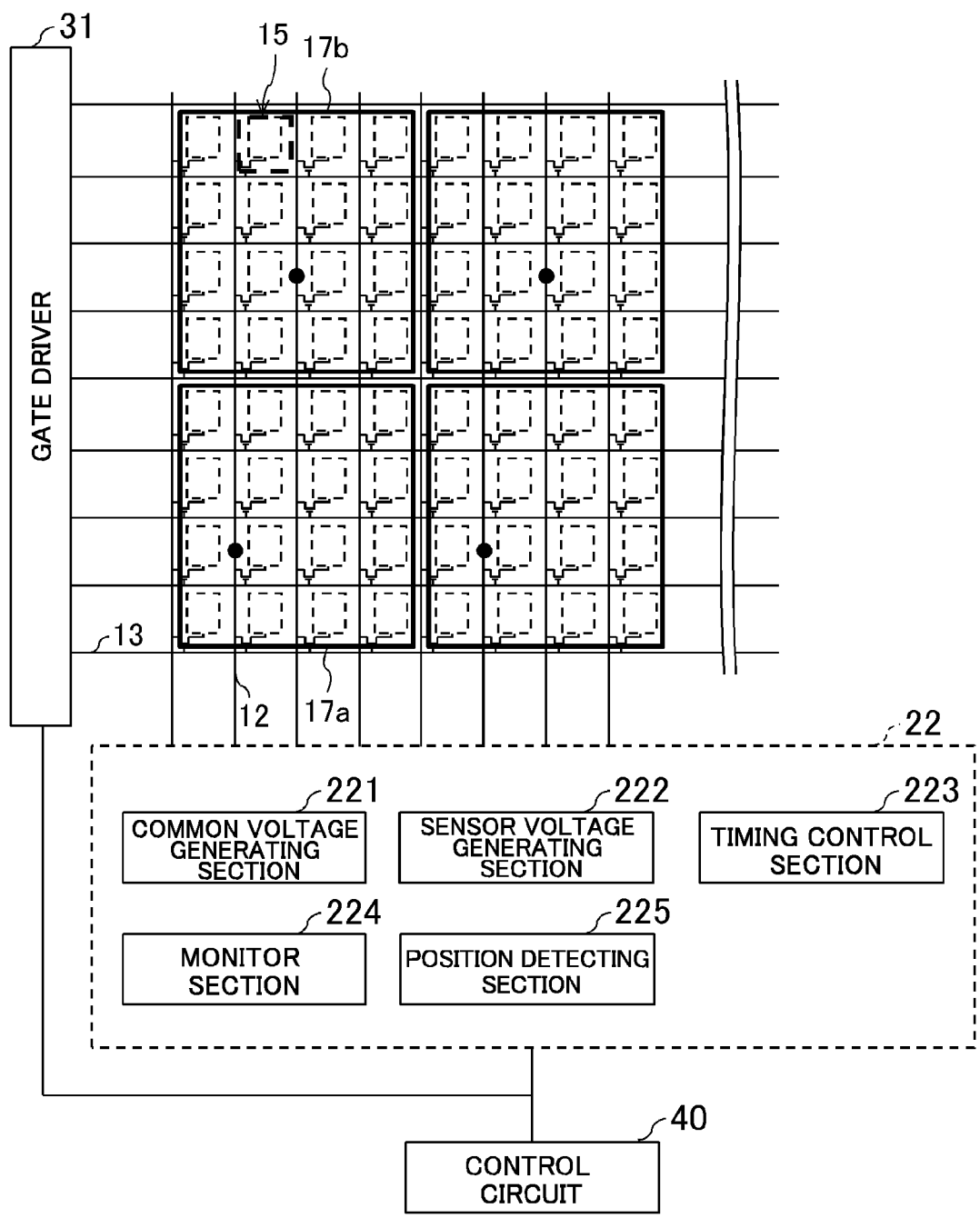
FIG. 3 is a block diagram for illustrating a configuration example of a common/sensor driver.

FIG. 3 is a block diagram for illustrating a configuration example of the common/sensor driver 22. The common/sensor driver 22 includes a common voltage generating section 221, a sensor voltage generating section 222, a timing control section 223, a monitor section 224, and a position detecting section 225. The configuration of the common/sensor driver 22 is not limited thereto, and a well-known configuration can be adopted.

The common voltage generating section 221 generates the common voltage Vcom (reference voltage) for image display. The common/sensor driver 22 supplies the above-mentioned generated common voltage to the common electrode 17 via the sensor electrode line 12 during a writing period for supplying a data signal (display voltage) to the pixel electrode 16. The sensor voltage generating section 222 generates the sensor voltage for detecting the touch position. The common/sensor driver 22 supplies the above-mentioned generated sensor voltage to the common electrode 17 via the sensor electrode line 12 during a non-writing period after the above-mentioned writing period. The timing control section 223 controls timing for the common/sensor driver 22 to output the above-mentioned common voltage and the above-mentioned sensor voltage based on a timing signal (horizontal synchronization signal and vertical synchronization signal) received from the control circuit 40. The monitor section 224 monitors (measures) a current (charge) when the sensor voltage is supplied to the common electrode 17. The position detecting section 225 detects the coordinates of the touch position based on the measurement result of the monitor section 224. Note that, in FIG. 3, the position detecting section 225 is included in the common/sensor driver 22, but may be included in the control circuit 40.

An example of a method of detecting the touch position is described. The liquid crystal display device 100 detects the touch position by means of a self-capacitance method of a capacitive system. Specifically, when a finger approaches the surface of the display panel 10, a capacitance is generated between the common electrode (sensor electrode) and the finger. When the capacitance is generated, a parasitic capacitance at the common electrode is increased, and a current (charge) is increased when the sensor voltage is supplied to the common electrode 17. The common/sensor driver 22 detects the position (coordinates) of the contact (touch) to the display panel based on the variation amount of this current (charge). Note that, a well-known method may be applied to the method of detecting the touch position by the self-capacitance method. For example, as in U.S. Pat. No. 8,766,950, the touch position may be detected during a non-display period.

Next, a sectional structure of the display panel 10 is described. Various sectional structures may be applied to the display panel 10. Description of configurations common to respective embodiments described below is omitted as appropriate. First to fourth embodiments each have a structure in which the common electrode 17 (sensor electrode) is arranged in a lower layer (back surface side), and the pixel electrode 16 is arranged in an upper layer (display surface side). Fifth to eighth embodiments each have a structure in which the pixel electrode 16 is arranged in a lower layer (back surface side), and the common electrode 17 (sensor electrode) is arranged in an upper layer (display surface side).

First Embodiment

Figure 4:
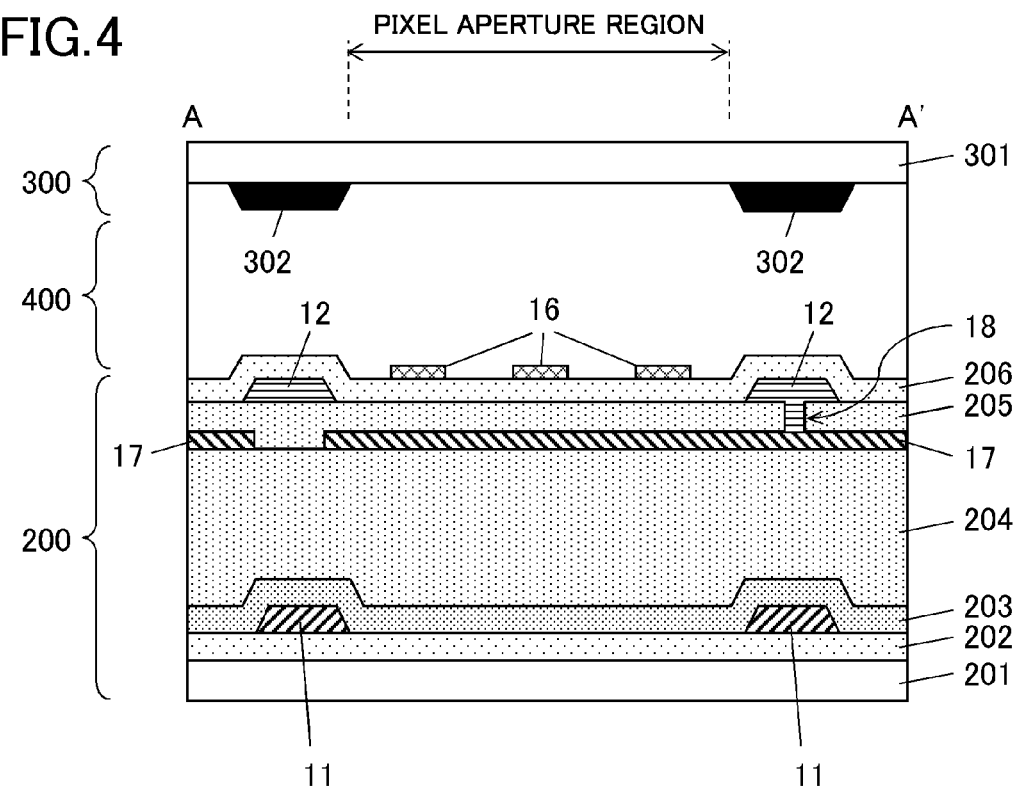
FIG. 4 is an A-A' sectional view of a display panel of a first embodiment.

FIG. 4 is a sectional view taken along the line A-A' of FIG. 2 in the display panel 10 of the first embodiment. The display panel 10 includes a TFT substrate 200, a color filter (CF) substrate 300, and a liquid crystal layer 400 sandwiched between both the substrates.

In the TFT substrate 200, the plurality of gate signal lines 13 (not shown) are formed on a glass substrate 201, a first insulating film 202 is formed so as to cover the plurality of gate signal lines 13, the plurality of data signal lines 11 are formed on the first insulating film 202, a second insulating film 203 is formed so as to cover the plurality of data signal lines 11, and a third insulating film 204 is formed on the second insulating film 203. The third insulating film 204 is made of, for example, a photosensitive organic material containing acrylic as a main component. The plurality of common electrodes 17 (sensor electrodes) are formed on the third insulating film 204, a fourth insulating film 205 is formed so as to cover the plurality of common electrodes 17, and the through hole 18 is formed through a part of the fourth insulating film 205. The fourth insulating film 205 is arranged between adjacent common electrodes 17, and hence the adjacent common electrodes 17 are not electrically connected to each other. The plurality of sensor electrode lines 12 are formed on the fourth insulating film 205 and inside the through hole 18, a fifth insulating film 206 is formed so as to cover the plurality of sensor electrode lines 12, and the plurality of pixel electrodes 16 are formed on the fifth insulating film 206. The sensor electrode line 12 is formed at a position at which the sensor electrode line 12 overlaps with the data signal line 11 in plan view. The sensor electrode line 12 is electrically connected to the common electrode 17 via the through hole 18. The fourth insulating film 205 is arranged between the sensor electrode line 12 and the common electrode 17, and hence the sensor electrode line 12 is not electrically connected to the common electrodes 17 other than the common electrode 17 electrically connected to the sensor electrode line 12 via the through hole 18. The pixel electrode 16 has slits formed therein. Note that, although not shown, an alignment film is formed on the pixel electrodes 16, and a polarizing plate is formed on the outer side of the glass substrate 201. A liquid crystal capacitance Clc is formed between the pixel electrode 16 and the common electrode 17.

In the CF substrate 300, a black matrix 302 is formed on a glass substrate 301. Although not shown, a color filter is formed on the glass substrate 301, an overcoat film is formed so as to cover the color filter, and an alignment film is formed on the overcoat film. A polarizing plate is formed on the outer side of the CF substrate 300.

Figure 29:
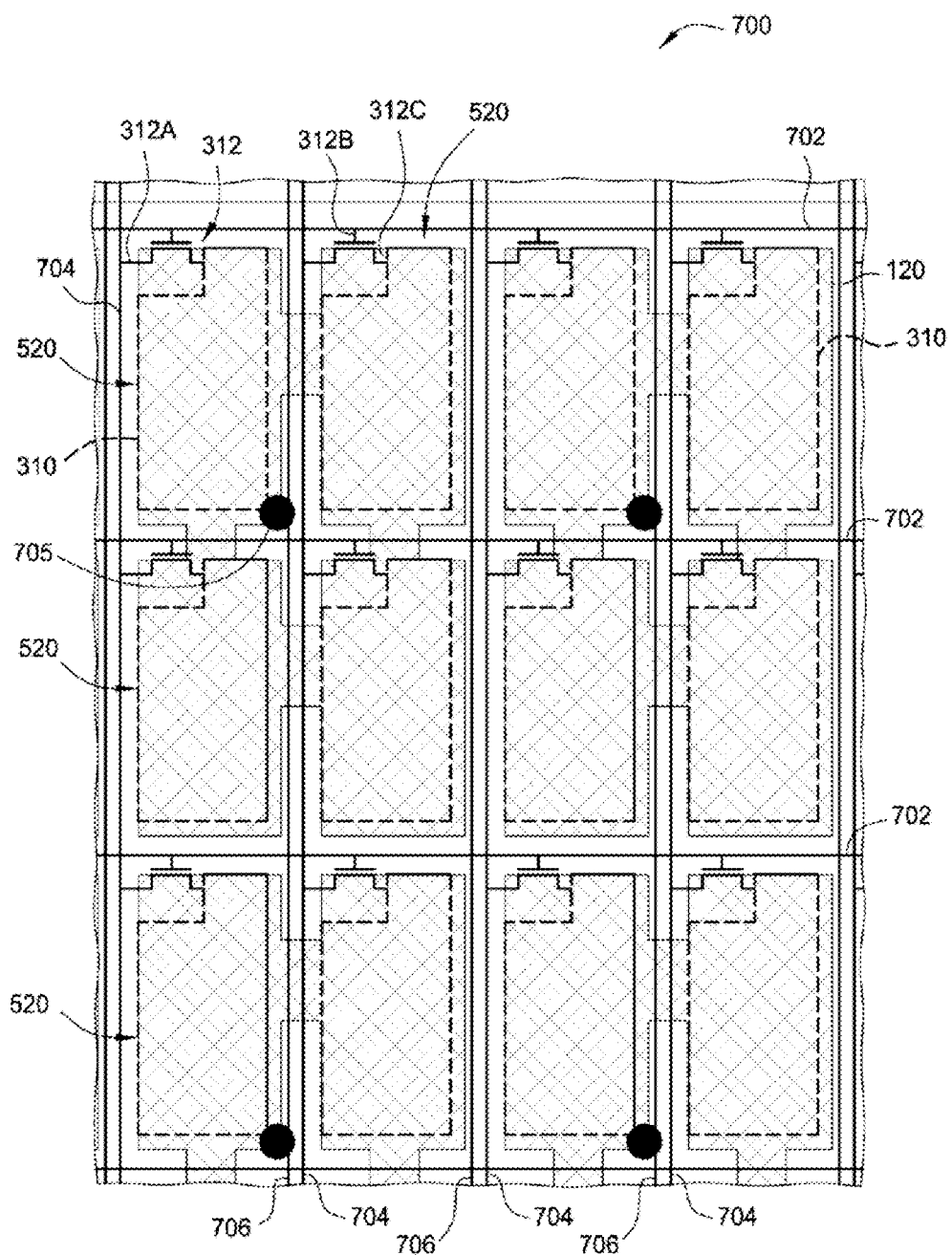
FIG. 29 is a plan view for illustrating a configuration of a related-art display panel.

The liquid crystal display device 100 applies an electric field generated between the pixel electrode 16 and the common electrode 17 to the liquid crystal layer 400 to drive the liquid crystal, thereby adjusting the amount of light passing through the liquid crystal layer 400 to display an image. With the above-mentioned configuration, the sensor electrode line 12 is arranged at a position at which the sensor electrode line 12 overlaps with the data signal line 11, that is, outside a pixel aperture region. Therefore, as compared to the related-art configuration (FIG. 29), the pixel aperture ratio can be increased. Further, the thick third insulating film 204 (organic insulating film) is interposed between the sensor electrode line 12 and the gate signal line 13, and hence the distance between the sensor electrode line 12 and the gate signal line 13 is increased. Therefore, as compared to the related-art configuration (FIG. 29), a parasitic capacitance to be formed between the sensor electrode line 12 and the gate signal line 13 can be decreased, and hence the detection accuracy of the touch position can be improved. Further, the common electrode 17 is formed on the third insulating film 204 (organic insulating film), and hence the common electrode 17 can be easily formed, thereby being capable of simplifying the manufacturing process.

Second Embodiment

Figure 5:
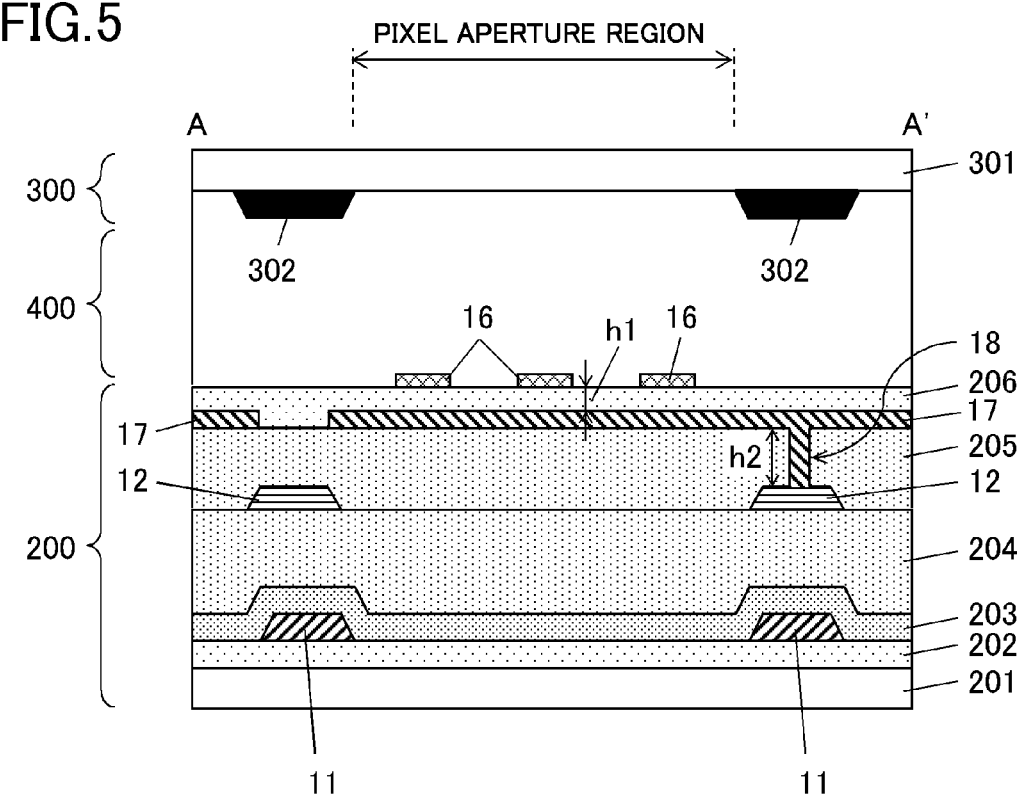
FIG. 5 is an A-A' sectional view of a display panel of a second embodiment.

FIG. 5 is a sectional view taken along the line A-A' of FIG. 2 in a display panel 10 of the second embodiment.

In the TFT substrate 200, the plurality of gate signal lines 13 (not shown) are formed on the glass substrate 201, the first insulating film 202 is formed so as to cover the plurality of gate signal lines 13, the plurality of data signal lines 11 are formed on the first insulating film 202, the second insulating film 203 is formed so as to cover the plurality of data signal lines 11, and the third insulating film 204 (organic insulating film) is formed on the second insulating film 203. The plurality of sensor electrode lines 12 are formed on the third insulating film 204, the fourth insulating film 205 is formed so as to cover the plurality of sensor electrode lines 12, and the through hole 18 is formed through a part of the fourth insulating film 205. The sensor electrode line 12 is formed at a position at which the sensor electrode line 12 overlaps with the data signal line 11 in plan view. The plurality of common electrodes 17 (sensor electrodes) are formed on the fourth insulating film 205 and inside the through hole 18, the fifth insulating film 206 is formed so as to cover the plurality of common electrodes 17, and the plurality of pixel electrodes 16 are formed on the fifth insulating film 206. The common electrode 17 is electrically connected to the sensor electrode line 12 via the through hole 18.

With the above-mentioned configuration, a distance h1 between the pixel electrode 16 and the common electrode 17 can be decreased, and thus the liquid crystal capacitance Clc to be formed between the pixel electrode 16 and the common electrode 17 can be increased. Therefore, the display quality can be improved. Further, a distance h2 between the sensor electrode line 12 and the common electrode (sensor electrode) can be increased, and hence a parasitic capacitance to be formed between the sensor electrode line 12 and the common electrode 17 can be decreased. The above-mentioned parasitic capacitance refers to a capacitance formed due to the structure between the common electrode 17 and the sensor electrode line 12 passing along the common electrode 17. For example, in FIG. 2, when the common electrode 17b is focused on, the above-mentioned parasitic capacitance refers to a parasitic capacitance formed between the common electrode 17b and each of the sensor electrode lines 12a and 12c. This parasitic capacitance is increased as the distance h2 between the common electrode 17b and each of the sensor electrode lines 12a and 12c is decreased, and is decreased as the distance h2 is increased. With the configuration of the second embodiment, the distance h2 can be increased, and hence the parasitic capacitance between the sensor electrode line 12 and the common electrode 17 can be decreased. Therefore, the detection accuracy of the touch position can be improved.

Further, with the above-mentioned configuration, the common electrode 17 (sensor electrode) is arranged close to the front surface (touch surface) of the display panel 10, and hence the detection accuracy of the touch position can be further improved.

Third Embodiment

Figure 6:
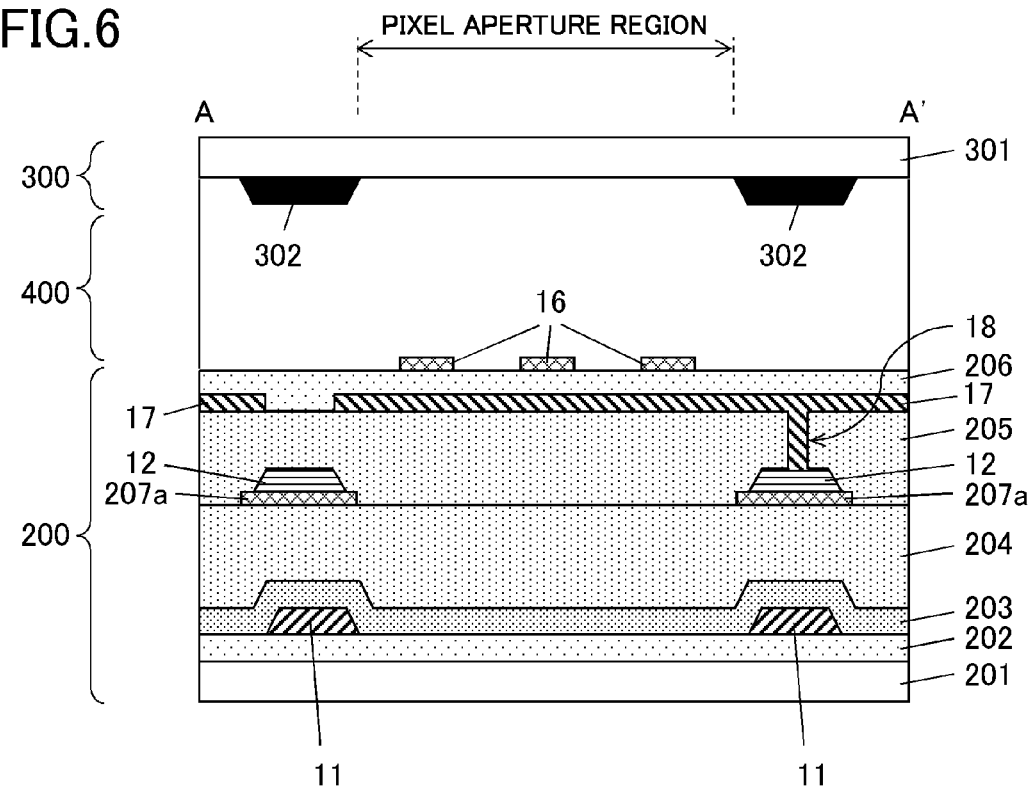
FIG. 6 is an A-A' sectional view of a display panel of a third embodiment.

FIG. 6 is a sectional view taken along the line A-A' of FIG. 2 in a display panel 10 of the third embodiment. The display panel 10 of the third embodiment is formed as follows. In the display panel 10 of the second embodiment, a plurality of adhesion layers 207a are formed on the third insulating film 204, and the sensor electrode lines 12 are formed on the respective adhesion layers 207a. The adhesion layer 207a and the sensor electrode line 12 are formed at a position at which the adhesion layer 207a and the sensor electrode line 12 overlap with the data signal line 11 in plan view. The adhesion layer 207a is made of, for example, indium tin oxide (ITO), which is a transparent conductive material.

With the above-mentioned configuration, the above-mentioned effects in the display panel 10 of the second embodiment can be obtained, and it is possible to prevent film removal of the sensor electrode line 12 from the third insulating film 204.

Fourth Embodiment

Figure 7:
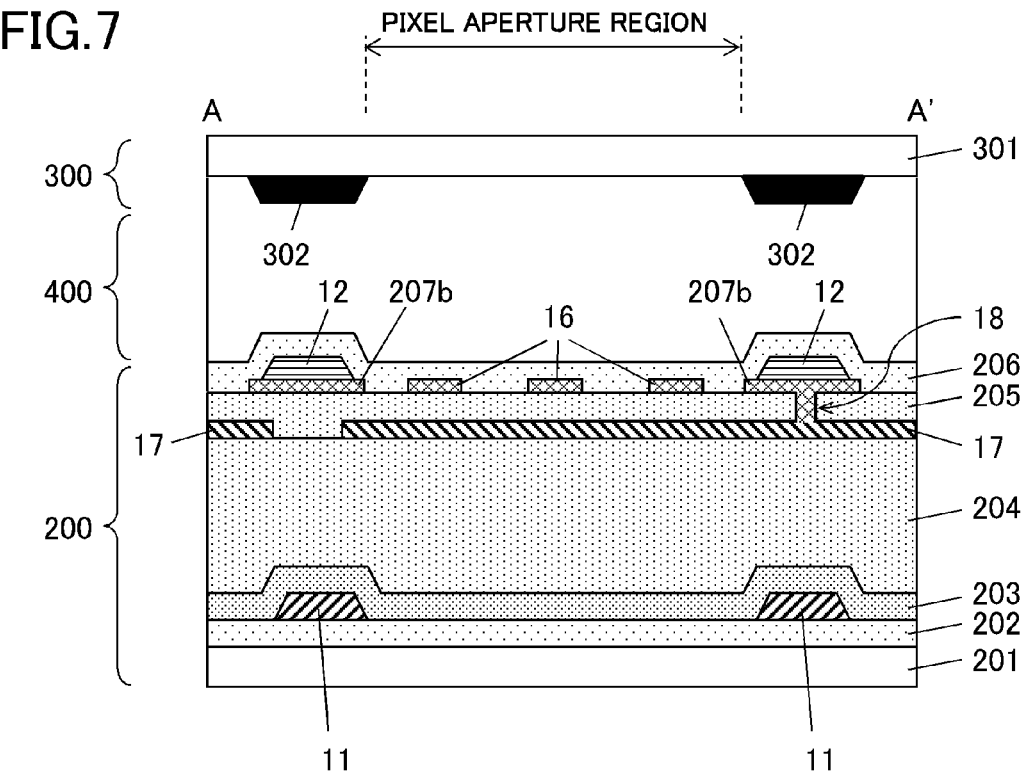
FIG. 7 is an A-A' sectional view of a display panel of a fourth embodiment.

FIG. 7 is a sectional view taken along the line A-A' of FIG. 2 in a display panel 10 of the fourth embodiment.

In the TFT substrate 200, the plurality of gate signal lines 13 (not shown) are formed on the glass substrate 201, the first insulating film 202 is formed so as to cover the plurality of gate signal lines 13, the plurality of data signal lines 11 are formed on the first insulating film 202, the second insulating film 203 is formed so as to cover the plurality of data signal lines 11, and the third insulating film 204 (organic insulating film) is formed on the second insulating film 203. The plurality of common electrodes 17 (sensor electrodes) are formed on the third insulating film 204, the fourth insulating film 205 is formed so as to cover the plurality of common electrodes 17, and the through hole 18 is formed through a part of the fourth insulating film 205. A plurality of conductive films 207b are formed on the fourth insulating film 205 and inside the through hole 18. Further, the plurality of pixel electrodes 16 are formed on the fourth insulating film 205. The sensor electrode lines 12 are formed on the respective conductive films 207b, and the fifth insulating film 206 is formed so as to cover the sensor electrode lines 12 and the pixel electrodes 16. The conductive film 207b and the sensor electrode line 12 are formed at a position at which the conductive film 207b and the sensor electrode line 12 overlap with the data signal line 11 in plan view. The sensor electrode line 12 is directly electrically connected to the conductive film 207b, and the conductive film 207b is electrically connected to the common electrode 17 via the through hole 18. With this, the sensor electrode line 12 is electrically connected to the common electrode 17.

With the above-mentioned configuration, the above-mentioned effects in the display panel 10 of the second embodiment can be obtained, and it is possible to prevent film removal of the sensor electrode line 12 from the fourth insulating film 205. In addition, the conductive film 207b can be formed in the same process as the pixel electrode 16, and hence the manufacturing cost can be suppressed.

The display panel 10 of each of the fifth to eighth embodiments described below has a structure in which the pixel electrode 16 is arranged in a lower layer and the common electrode 17 (sensor electrode) is arranged in an upper layer.

Figure 8:
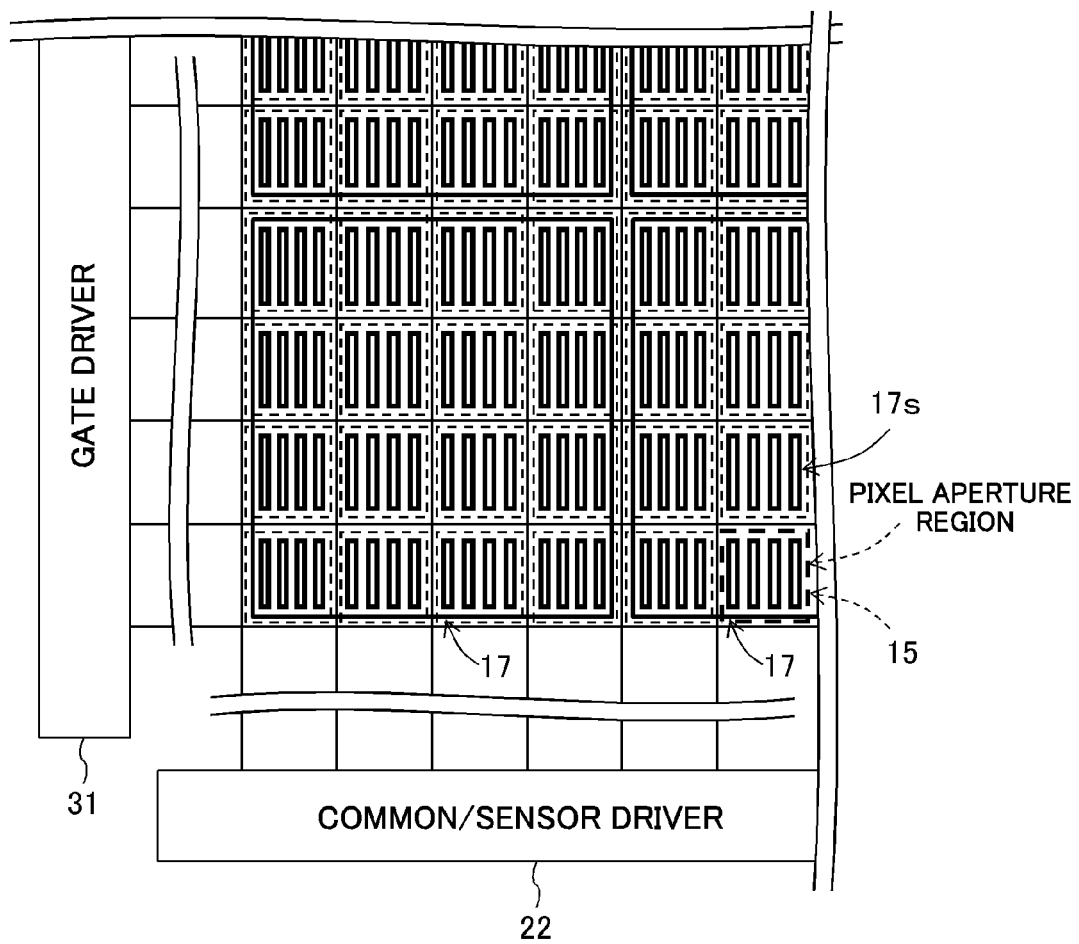
FIG. 8 is a plan view for illustrating a configuration of common electrodes of a display panel of each of fifth to eighth embodiments.

FIG. 8 is a plan view for illustrating the configuration of the common electrodes 17 in the display panel 10 of each of the fifth to eighth embodiments. The common electrodes 17 are arranged at a ratio of one to sixteen pixels 15. Slits 17s are formed in a pixel aperture region of each of the common electrodes 17. The number of the slits 17s formed in a single pixel aperture region is not limited.

Fifth Embodiment

Figure 9:
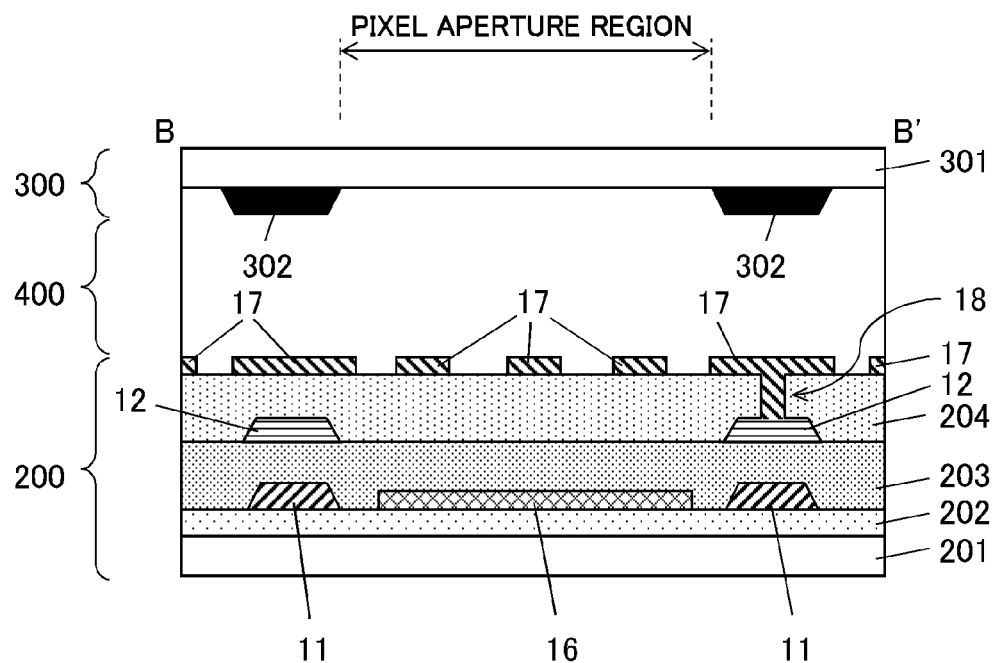
FIG. 9 is a B-B' sectional view of a display panel of a fifth embodiment.

FIG. 9 is a sectional view taken along the line B-B' of FIG. 2 in a display panel 10 of the fifth embodiment. Note that, in FIG. 2, the slits 17s are omitted.

In the TFT substrate 200, the plurality of gate signal lines 13 (not shown) are formed on the glass substrate 201, the first insulating film 202 is formed so as to cover the plurality of gate signal lines 13, the plurality of data signal lines 11 and the plurality of pixel electrodes 16 are formed on the first insulating film 202, and the second insulating film 203 is formed so as to cover the plurality of data signal lines 11 and the plurality of pixel electrodes 16. The plurality of sensor electrode lines 12 are formed on the second insulating film 203, the third insulating film 204 is formed so as to cover the plurality of sensor electrode lines 12, and the through hole 18 is formed through a part of the third insulating film 204. The sensor electrode line 12 is formed at a position at which the sensor electrode line 12 overlaps with the data signal line 11 in plan view. The common electrodes 17 (sensor electrodes) are formed on the third insulating film 204 and inside the through hole 18. The common electrode 17 is electrically connected to the sensor electrode line 12 via the through hole 18. Note that, although not shown, an alignment film is formed on the common electrode 17, and a polarizing plate is formed on the outer side of the glass substrate 201. A liquid crystal capacitance Clc is formed between the pixel electrode 16 and the common electrode 17.

With the above-mentioned configuration, the sensor electrode line 12 is arranged at a position at which the sensor electrode line 12 overlaps with the data signal line 11, that is, outside the pixel aperture region. Therefore, as compared to the related-art configuration (FIG. 29), the pixel aperture ratio can be increased. Further, the common electrode 17 (sensor electrode) is arranged close to the front surface (touch surface) of the display panel 10, and hence the detection accuracy of the touch position can be improved. Further, the pixel electrode 16 is formed in the same layer as the data signal line 11, and hence the manufacturing process can be simplified.

Sixth Embodiment

Figure 10:
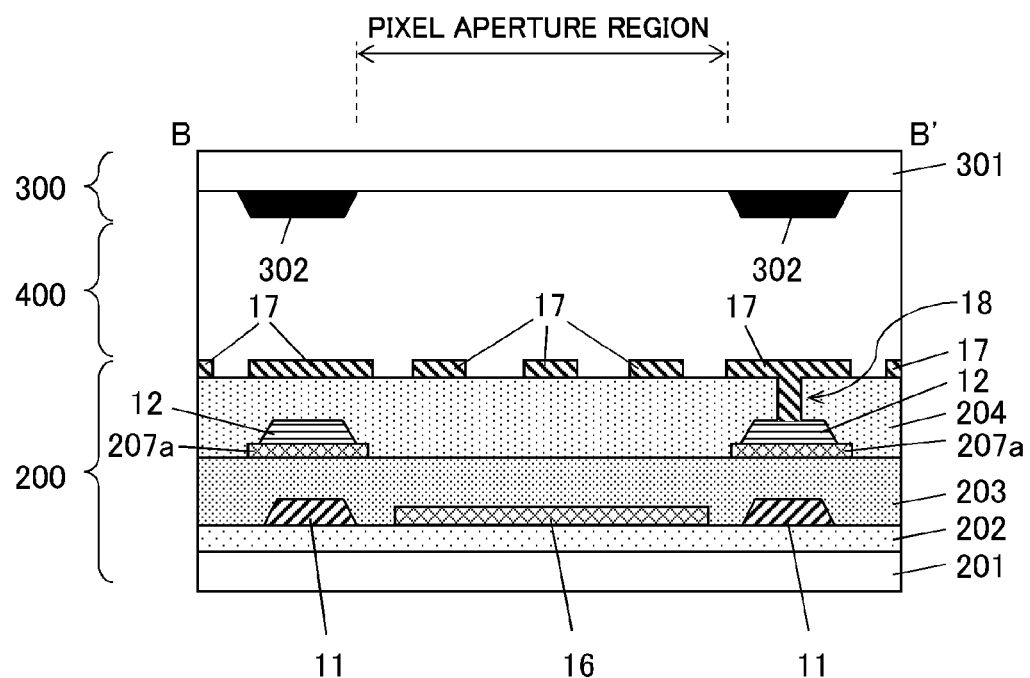
FIG. 10 is a B-B' sectional view of a display panel of a sixth embodiment.

FIG. 10 is a sectional view taken along the line B-B' of FIG. 2 in a display panel 10 of the sixth embodiment. The display panel 10 of the sixth embodiment is formed as follows. In the display panel 10 of the fifth embodiment (see FIG. 9), the plurality of adhesion layers 207a are formed on the second insulating film 203, and the sensor electrode lines 12 are formed on the respective adhesion layers 207a. The adhesion layer 207a and the sensor electrode line 12 are formed at a position at which the adhesion layer 207a and the sensor electrode line 12 overlap with the data signal line 11 in plan view. The adhesion layer 207a is made of, for example, ITO. With the above-mentioned configuration, the above-mentioned effects in the display panel 10 of the fifth embodiment can be obtained, and the film removal of the sensor electrode line 12 can be prevented.

Seventh Embodiment

Figure 11:
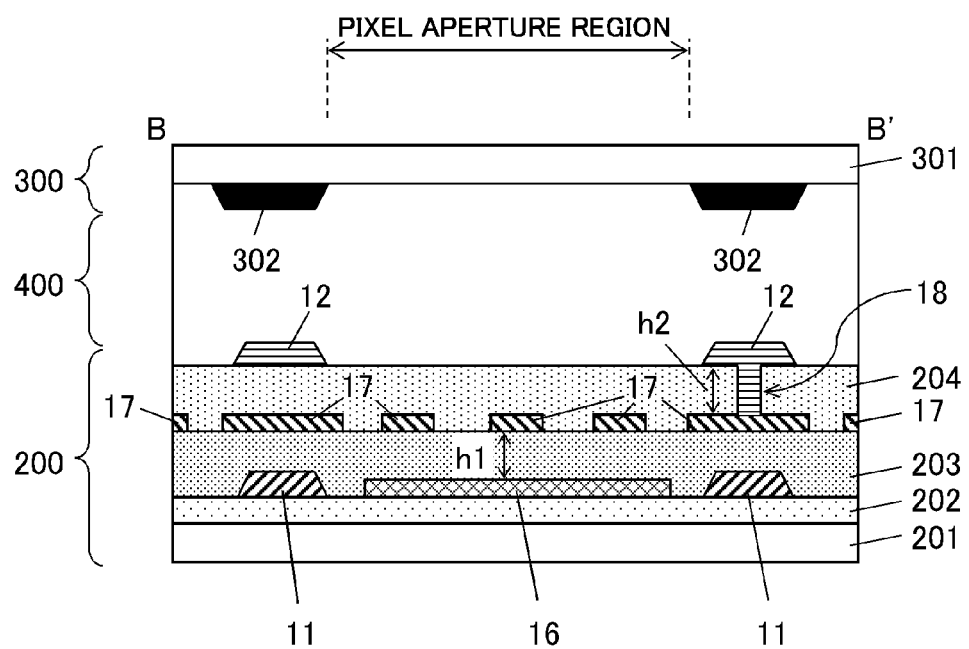
FIG. 11 is a B-B' sectional view of a display panel of a seventh embodiment.

FIG. 11 is a sectional view taken along the line B-B' of FIG. 2 in a display panel 10 of the seventh embodiment.

In the TFT substrate 200, the plurality of gate signal lines 13 (not shown) are formed on the glass substrate 201, the first insulating film 202 is formed so as to cover the plurality of gate signal lines 13, the plurality of data signal lines 11 and the plurality of pixel electrodes 16 are formed on the first insulating film 202, and the second insulating film 203 is formed so as to cover the plurality of data signal lines 11 and the plurality of pixel electrodes 16. The plurality of common electrodes 17 (sensor electrodes) are formed on the second insulating film 203, the third insulating film 204 is formed so as to cover the plurality of common electrodes 17, and the through hole 18 is formed through a part of the third insulating film 204. The plurality of sensor electrode lines 12 are formed on the third insulating film 204 and inside the through hole 18. The sensor electrode line 12 is formed at a position at which the sensor electrode line 12 overlaps with the data signal line 11 in plan view. The sensor electrode line 12 is electrically connected to the common electrode 17 via the through hole 18.

With the above-mentioned configuration, the distance h1 between the pixel electrode 16 and the common electrode 17 can be decreased, and hence the liquid crystal capacitance Clc to be formed between the pixel electrode 16 and the common electrode 17 can be increased. Therefore, the display quality can be improved. Further, the distance h2 between the sensor electrode line 12 and the common electrode 17 (sensor electrode) can be increased, and hence the parasitic capacitance to be formed between the sensor electrode line 12 and the common electrode 17 can be decreased. Therefore, the detection accuracy of the touch position can be improved. Further, the distance between the sensor electrode line 12 and the gate signal line 13 can be increased, and hence the parasitic capacitance to be formed between the sensor electrode line 12 and the gate signal line 13 can be decreased. Therefore, the detection accuracy of the touch position can be improved. Further, the pixel electrode 16 is formed in the same layer as the data signal line 11, and hence the manufacturing process can be simplified.

Eighth Embodiment

Figure 12:
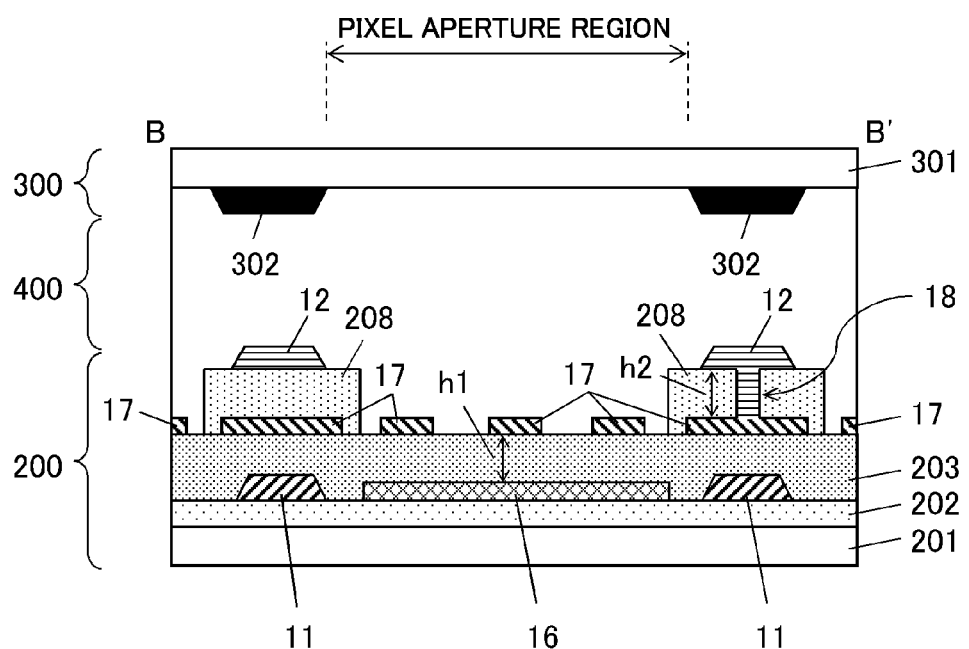
FIG. 12 is a B-B' sectional view of a display panel of an eighth embodiment.

FIG. 12 is a sectional view taken along the line B-B' of FIG. 2 in a display panel 10 of the eighth embodiment. The display panel 10 of the eighth embodiment is formed as follows. In the display panel 10 of the seventh embodiment (see FIG. 11), the third insulating film 204 is changed into a third insulating film 208 (organic insulating film) made of an organic material. Further, the third insulating film 208 is selectively formed (patterned) so as to be arranged only under each sensor electrode line 12. With the above-mentioned configuration, the above-mentioned effects in the display panel 10 of the seventh embodiment can be obtained, and it is possible to prevent reduction in intensity of an electric field to be applied to the liquid crystal layer 400. Therefore, the display quality can be improved.

The display panel 10 of each of the above-mentioned first to fourth embodiments may include shielding wiring for preventing electric field leakage from a gap between adjacent common electrodes 17. The display panel 10 of each of ninth to twelfth embodiments described below includes the above-mentioned shielding wiring in the display panel 10 of each of the first to fourth embodiments.

Ninth Embodiment

Figure 13:
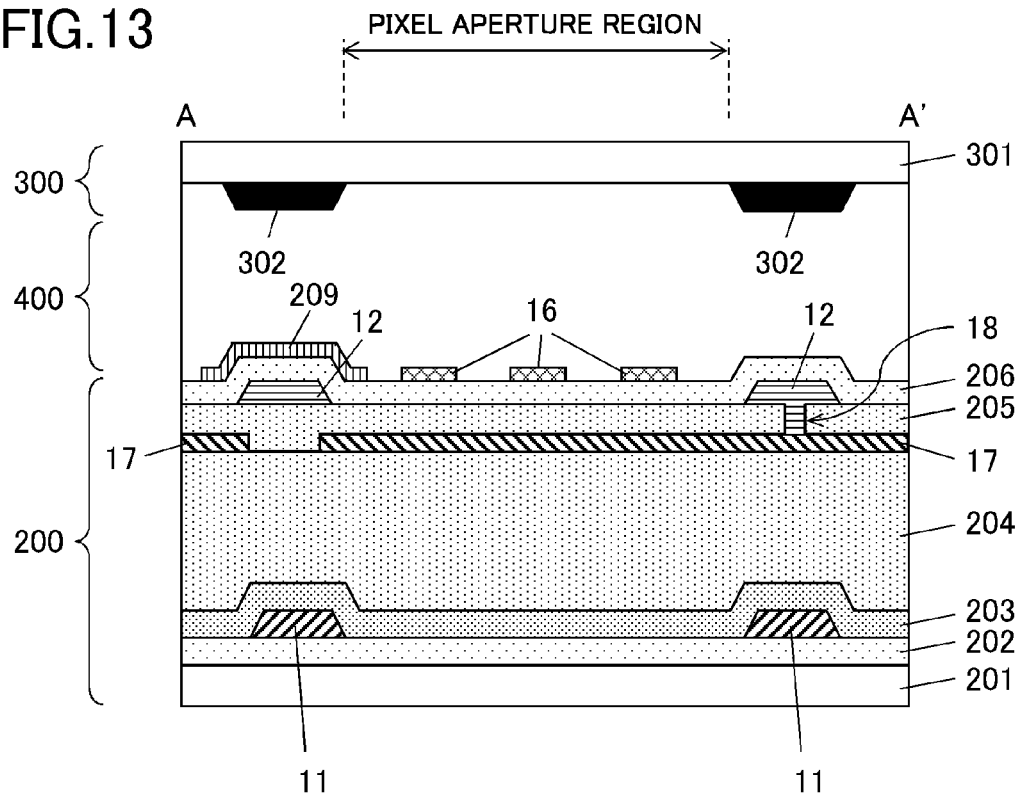
FIG. 13 is an A-A' sectional view of a display panel of a ninth embodiment.

FIG. 13 is a sectional view taken along the line A-A' of FIG. 2 in a display panel 10 of the ninth embodiment. The display panel 10 of the ninth embodiment is formed as follows. In the display panel 10 of the first embodiment (see FIG. 4), shielding wiring 209 is arranged so as to cover the gap between the adjacent common electrodes 17 (sensor electrodes) in plan view. With the above-mentioned configuration, it is possible to prevent the leakage electric field from the data signal line 11 from reaching the liquid crystal layer 400 through the gap between the adjacent common electrodes 17. Therefore, it is possible to prevent reduction in display quality due to image disturbance caused by the leakage electric field.

Tenth Embodiment

Figure 14:
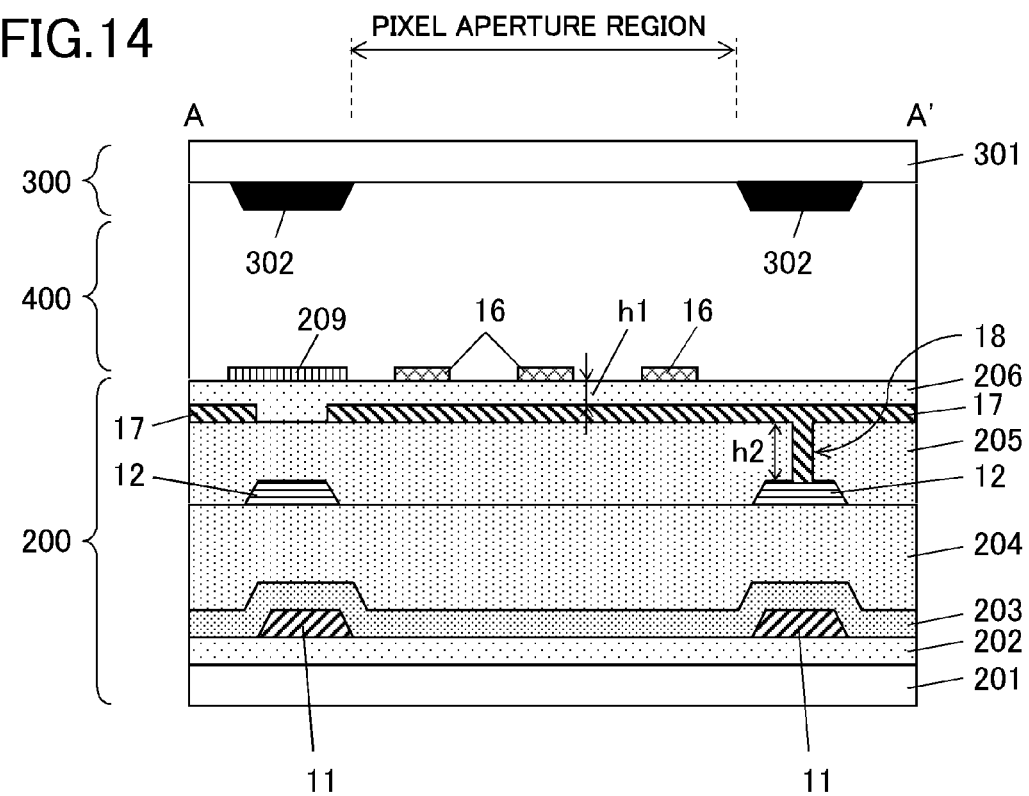
FIG. 14 is an A-A' sectional view of a display panel of a tenth embodiment.

FIG. 14 is a sectional view taken along the line A-A' of FIG. 2 in a display panel 10 of the tenth embodiment. The display panel 10 of the tenth embodiment is formed as follows. In the display panel 10 of the second embodiment (see FIG. 5), the shielding wiring 209 is arranged so as to cover the gap between the adjacent common electrodes 17 (sensor electrodes). With the above-mentioned configuration, similarly to the display panel 10 of the ninth embodiment, it is possible to prevent reduction in display quality due to image disturbance caused by the leakage electric field.

Eleventh Embodiment

Figure 15:
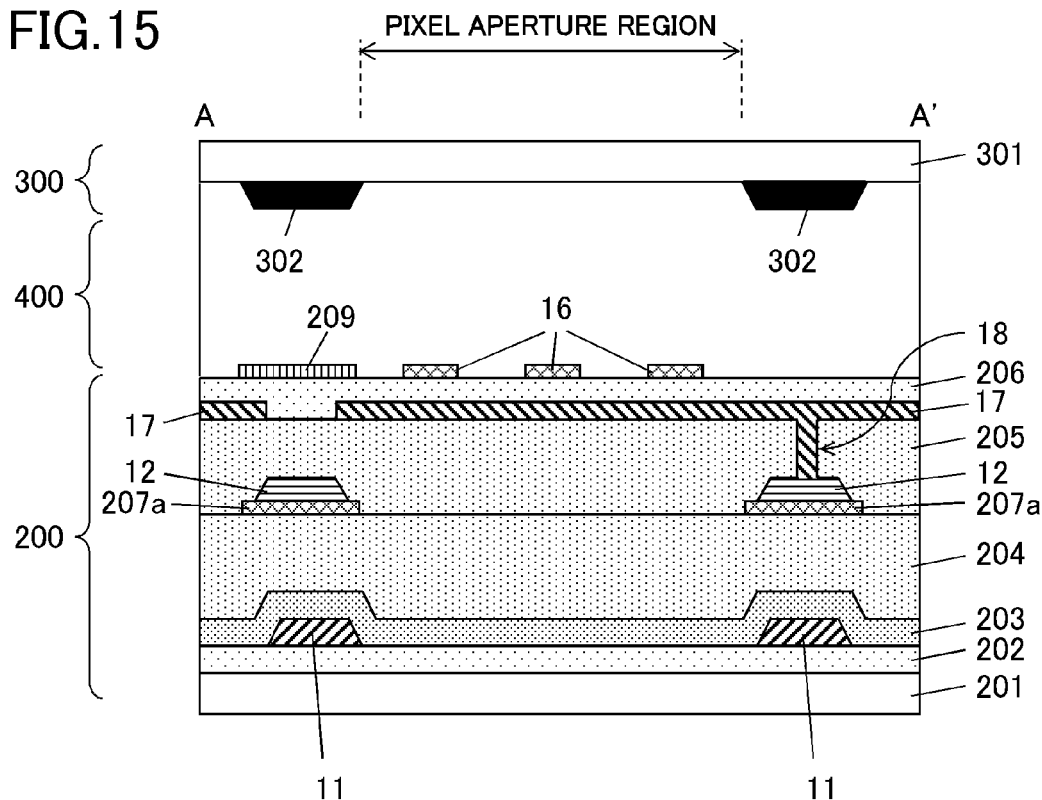
FIG. 15 is an A-A' sectional view of a display panel of an eleventh embodiment.

FIG. 15 is a sectional view taken along the line A-A' of FIG. 2 in a display panel 10 of the eleventh embodiment. The display panel 10 of the eleventh embodiment is formed as follows. In the display panel 10 of the third embodiment (see FIG. 6), the shielding wiring 209 is arranged so as to cover the gap between the adjacent common electrodes 17 (sensor electrodes). With the above-mentioned configuration, similarly to the display panel 10 of the ninth embodiment, it is possible to prevent reduction in display quality due to image disturbance caused by the leakage electric field.

Twelfth Embodiment

Figure 16:
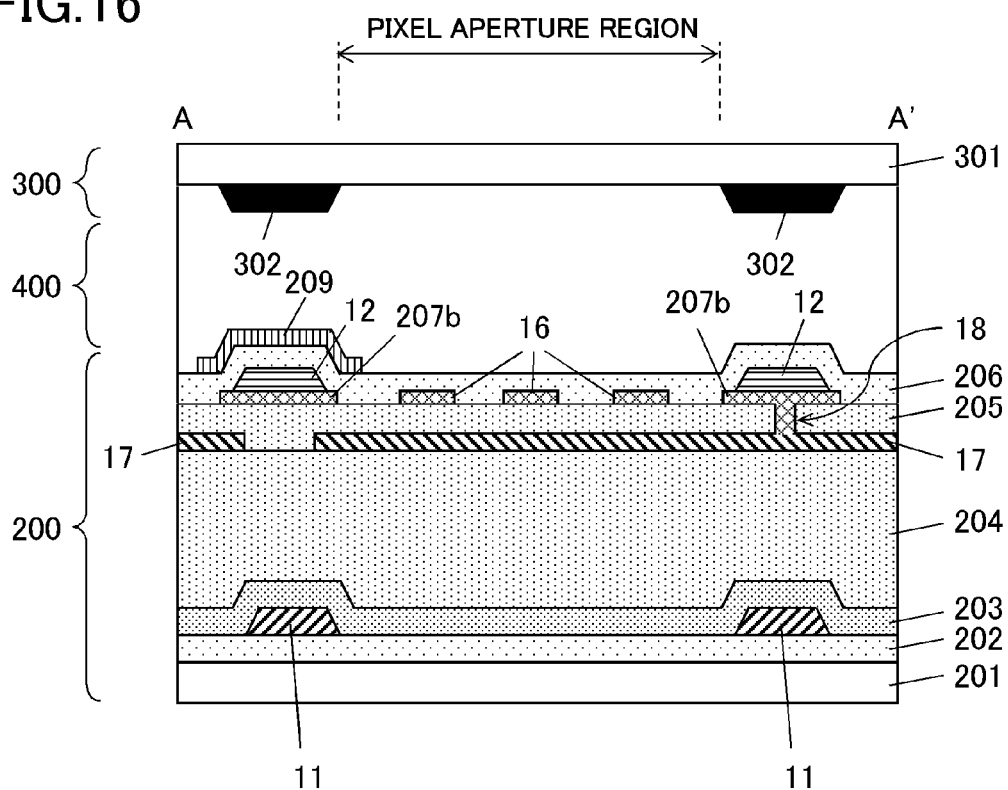
FIG. 16 is an A-A' sectional view of a display panel of a twelfth embodiment.

FIG. 16 is a sectional view taken along the line A-A' of FIG. 2 in a display panel 10 of the twelfth embodiment. The display panel 10 of the twelfth embodiment is formed as follows. In the display panel 10 of the fourth embodiment (see FIG. 7), the shielding wiring 209 is arranged so as to cover the gap between the adjacent common electrodes 17 (sensor electrodes). With the above-mentioned configuration, similarly to the display panel 10 of the ninth embodiment, it is possible to prevent reduction in display quality due to image disturbance caused by the leakage electric field.

Figure 17:
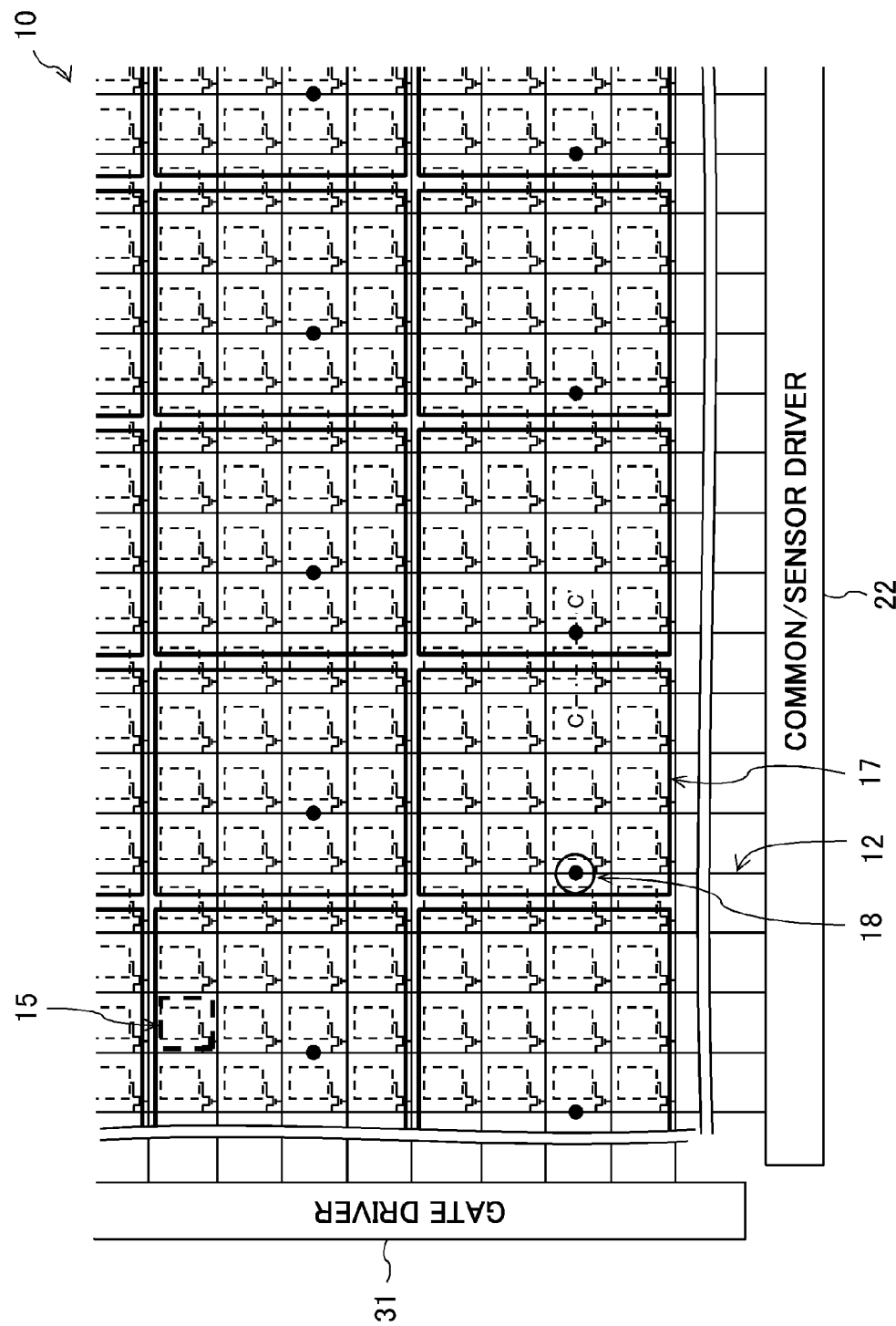
FIG. 17 is a plan view for illustrating a configuration of a display panel of each of thirteenth to sixteenth embodiments.

In the above-mentioned display panel 10 of each of the first to fourth embodiments, the plurality of common electrodes 17 are arranged so that the gap between the adjacent common electrodes 17 overlaps with the gap between adjacent pixels in plan view. However, in the display panel 10 according to this embodiment, the arrangement of the common electrodes 17 is not limited to the above-mentioned configuration (arrangement). For example, the plurality of common electrodes 17 may be arranged so that the gap between the adjacent common electrodes 17 is positioned in the vicinity of the center of the pixel region (or in the pixel aperture region). The display panel 10 of each of thirteenth to sixteenth embodiments described below has the above-mentioned configuration (arrangement). FIG. 17 is a plan view for illustrating a configuration common to the display panels 10 of the thirteenth to sixteenth embodiments.

Thirteenth Embodiment

Figure 18:
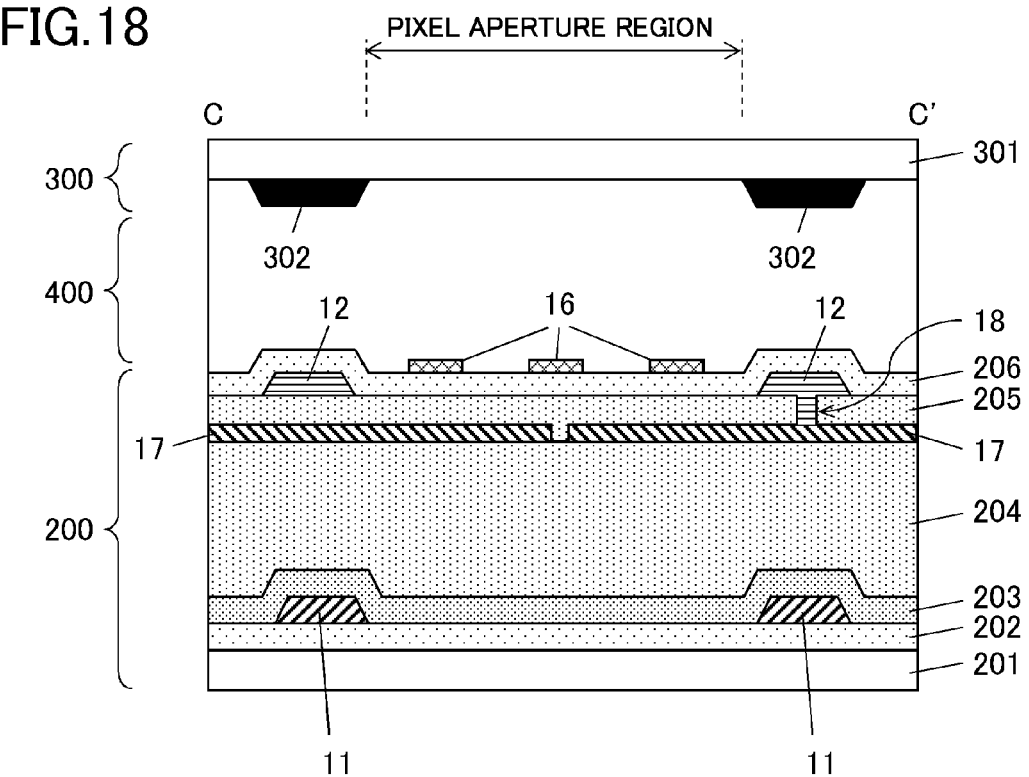
FIG. 18 is a C-C' sectional view of a display panel of a thirteenth embodiment.

FIG. 18 is a sectional view taken along the line C-C' of FIG. 17 in a display panel 10 of the thirteenth embodiment. The display panel 10 of the thirteenth embodiment is formed as follows. In the display panel 10 of the first embodiment (see FIG. 4), the plurality of common electrodes 17 are arranged so that the gap between the adjacent common electrodes 17 is positioned in the pixel aperture region in plan view. With the above-mentioned configuration, the leakage electric field from the data signal line 11 can be blocked by the common electrode 17. Therefore, it is possible to prevent reduction in display quality due to image disturbance caused by the leakage electric field.

Fourteenth Embodiment

Figure 19:
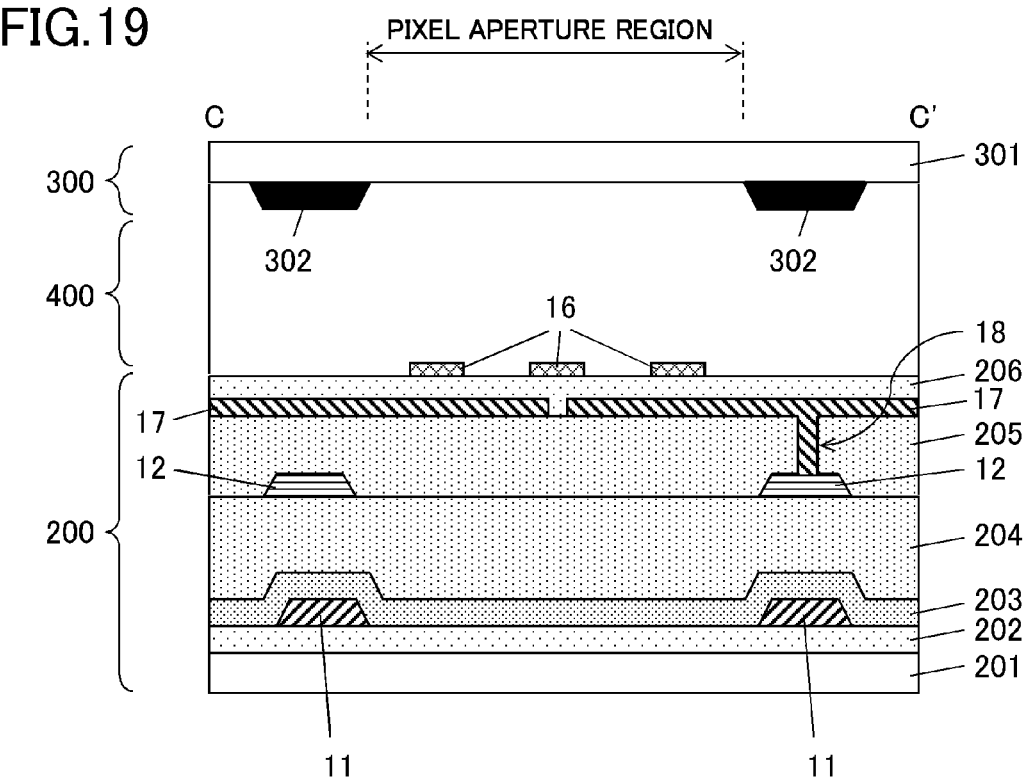
FIG. 19 is a C-C' sectional view of a display panel of a fourteenth embodiment.

FIG. 19 is a sectional view taken along the line C-C' of FIG. 17 in a display panel 10 of the fourteenth embodiment. The display panel 10 of the fourteenth embodiment is formed as follows. In the display panel 10 of the second embodiment (see FIG. 5), the plurality of common electrodes 17 are arranged so that the gap between the adjacent common electrodes 17 is positioned in the pixel aperture region in plan view. With the above-mentioned configuration, similarly to the display panel 10 of the thirteenth embodiment, it is possible to prevent reduction in display quality due to image disturbance caused by the leakage electric field.

Fifteenth Embodiment

Figure 20:
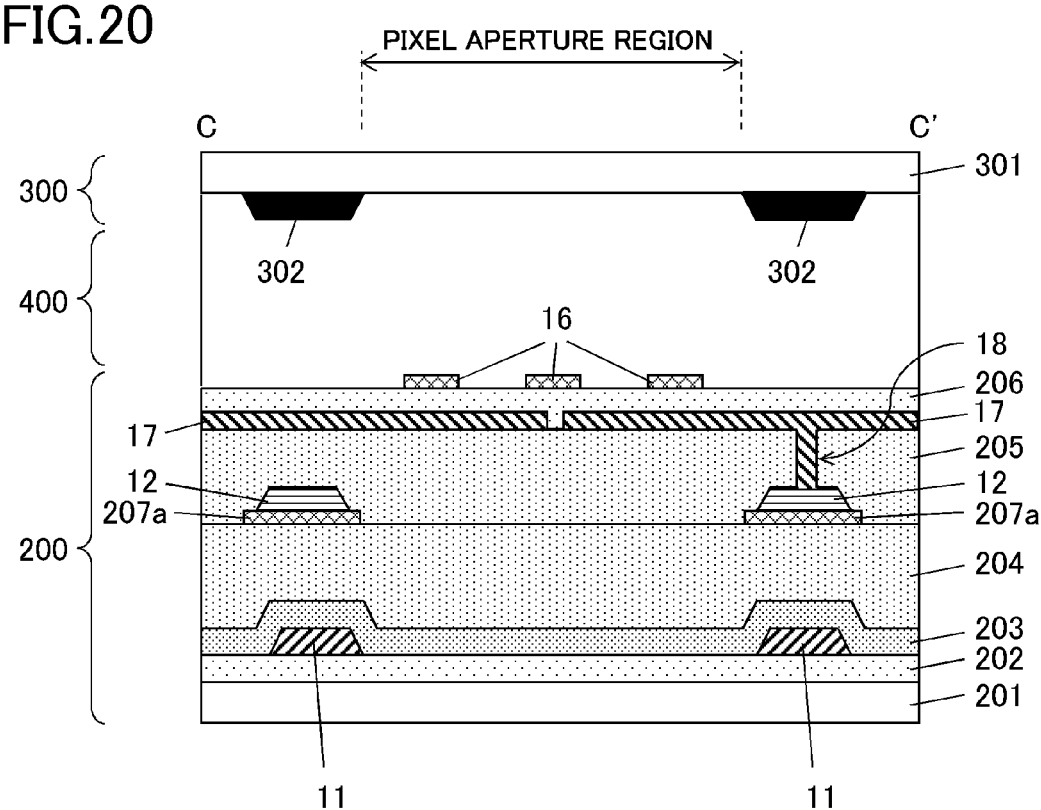
FIG. 20 is a C-C' sectional view of a display panel of a fifteenth embodiment.

FIG. 20 is a sectional view taken along the line C-C' of FIG. 17 in a display panel 10 of the fifteenth embodiment. The display panel 10 of the fifteenth embodiment is formed as follows. In the display panel 10 of the third embodiment (see FIG. 6), the plurality of common electrodes 17 are arranged so that the gap between the adjacent common electrodes 17 is positioned in the pixel aperture region in plan view. With the above-mentioned configuration, similarly to the display panel 10 of the thirteenth embodiment, it is possible to prevent reduction in display quality due to image disturbance caused by the leakage electric field.

Sixteenth Embodiment

Figure 21:
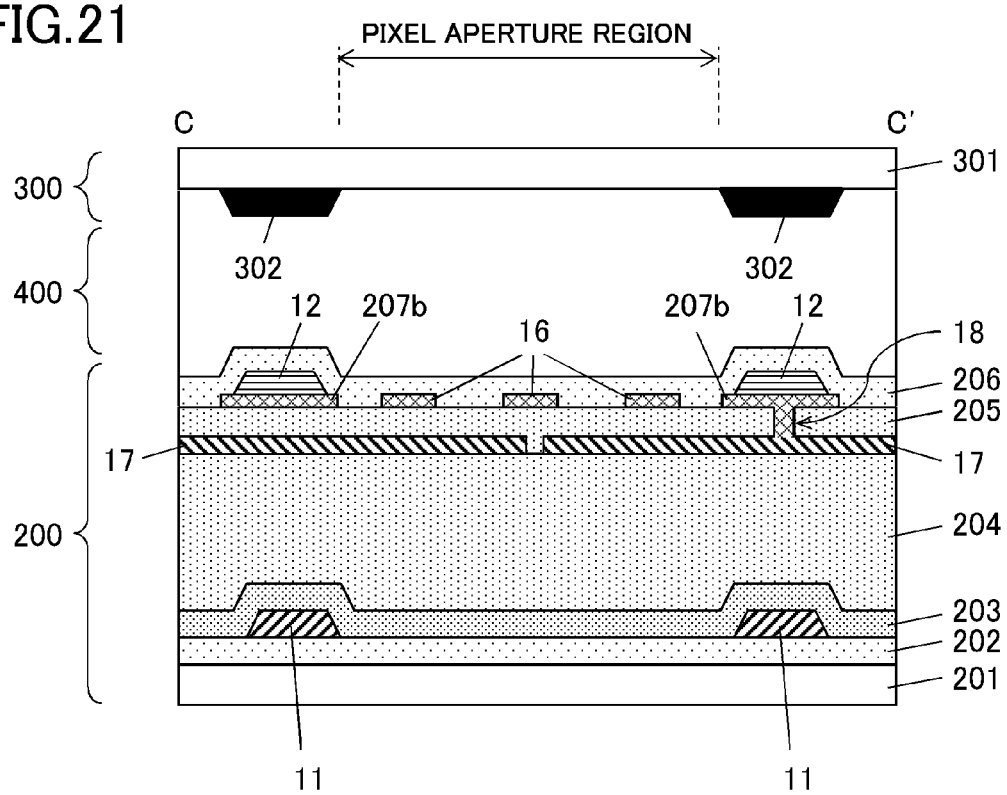
FIG. 21 is a C-C' sectional view of a display panel of a sixteenth embodiment.

FIG. 21 is a sectional view taken along the line C-C' of FIG. 17 in a display panel 10 of the sixteenth embodiment. The display panel 10 of the sixteenth embodiment is formed as follows. In the display panel 10 of the fourth embodiment (see FIG. 7), the plurality of common electrodes 17 are arranged so that the gap between the adjacent common electrodes 17 is positioned in the pixel aperture region in plan view. With the above-mentioned configuration, similarly to the display panel 10 of the thirteenth embodiment, it is possible to prevent reduction in display quality due to image disturbance caused by the leakage electric field.

Figure 22:
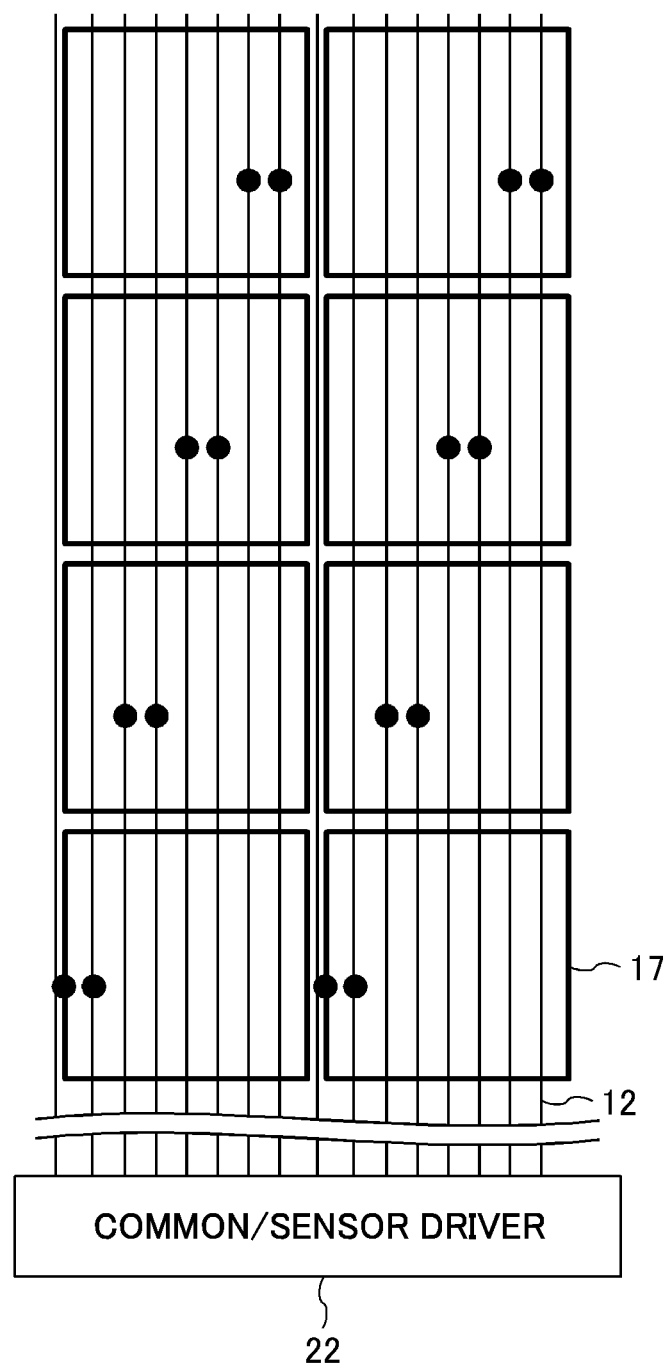
FIG. 22 is a plan view for illustrating a configuration of a display panel.
Figure 23:
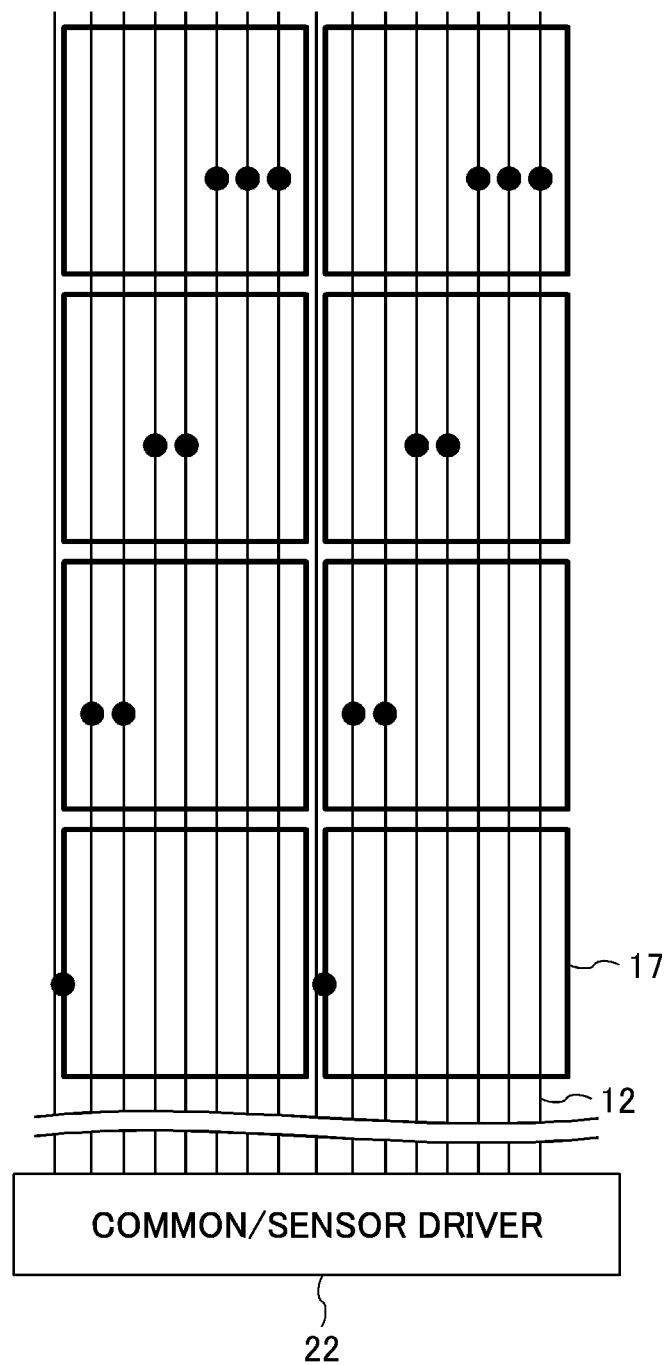
FIG. 23 is a plan view for illustrating a configuration of a display panel.
Figure 24:
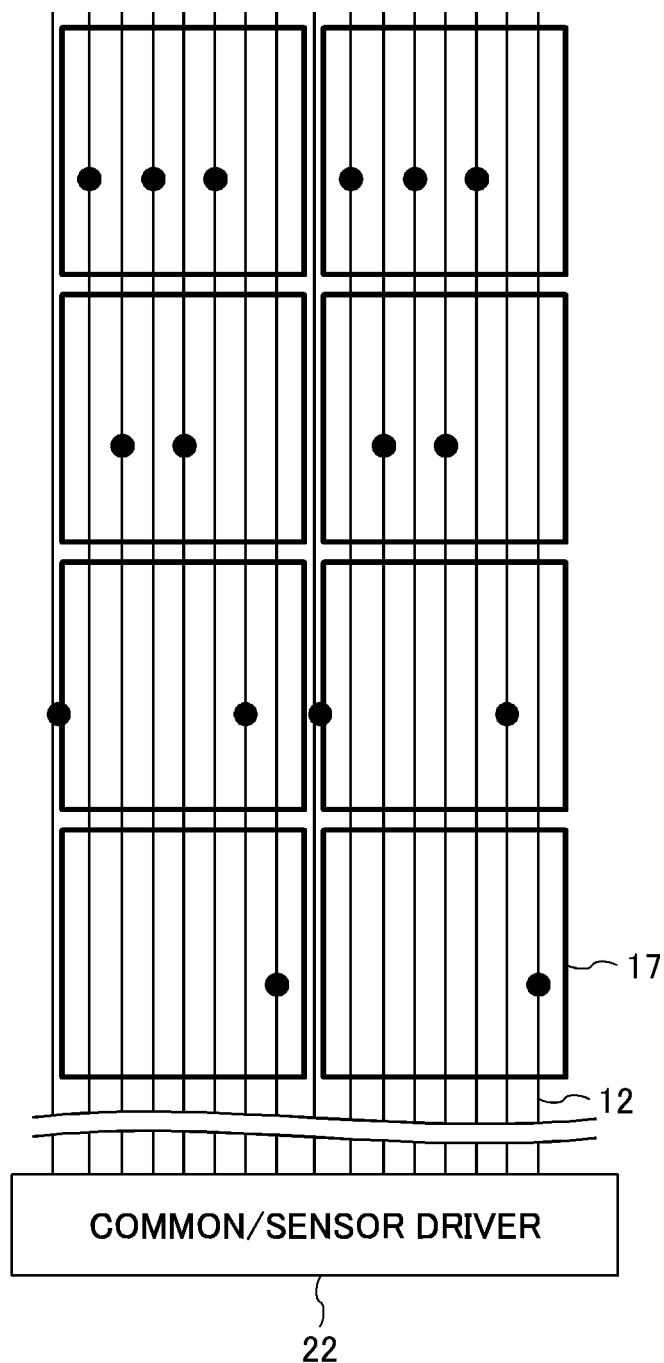
FIG. 24 is a plan view for illustrating a configuration of a display panel.

In the above-mentioned display panel 10 of each of the first to sixteenth embodiments, each common electrode 17 (sensor electrode) is electrically connected to a single sensor electrode line 12. However, the number of sensor electrode lines 12 to be electrically connected to the common electrode 17 is not limited. For example, each common electrode 17 (sensor electrode) may be electrically connected to two or more sensor electrode lines 12. FIGS. 22 to 24 are plan views for illustrating configurations common to the display panels 10 of the first to sixteenth embodiments. In the configuration of FIG. 22, each common electrode 17 is electrically connected to two sensor electrode lines 12. Therefore, as compared to the case where each common electrode 17 is electrically connected to a single sensor electrode line 12, power feeding performance to each common electrode 17 can be improved. In the configuration of FIG. 23, the number of sensor electrode lines 12 to be electrically connected to the common electrode 17 arranged on a side closer to the common/sensor driver 22 is smaller than the number of sensor electrode lines 12 to be electrically connected to the common electrode 17 arranged on a side farther from the common/sensor driver 22. Therefore, the wiring resistance of the common electrode 17 closer to the common/sensor driver 22 can be equalized with the wiring resistance of the common electrode 17 farther from the common/sensor driver 22. In the configuration of FIG. 24, the connection points between the common electrode 17 and the sensor electrode lines 12 are arranged in a dispersed manner in a region in which the common electrode 17 is formed. Therefore, the voltage distribution in a single common electrode 17 can be equalized in plan view.

Figure 25:
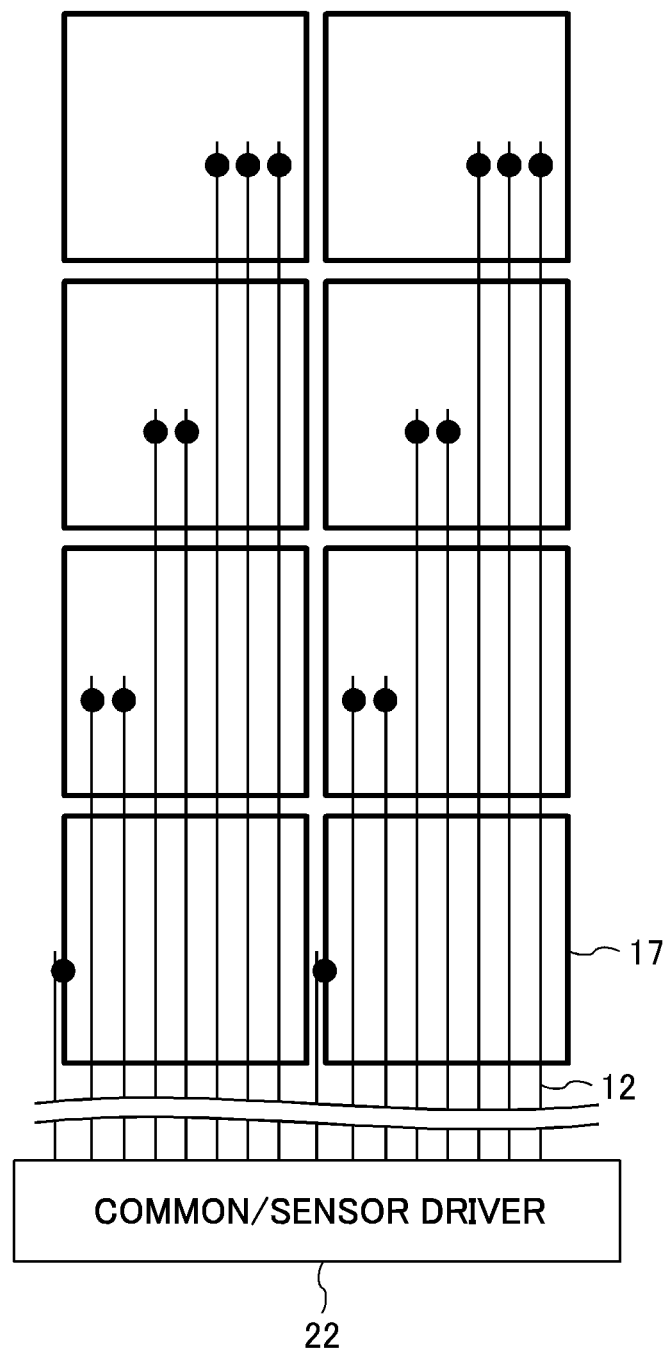
FIG. 25 is a plan view for illustrating a configuration of a display panel.
Figure 26:
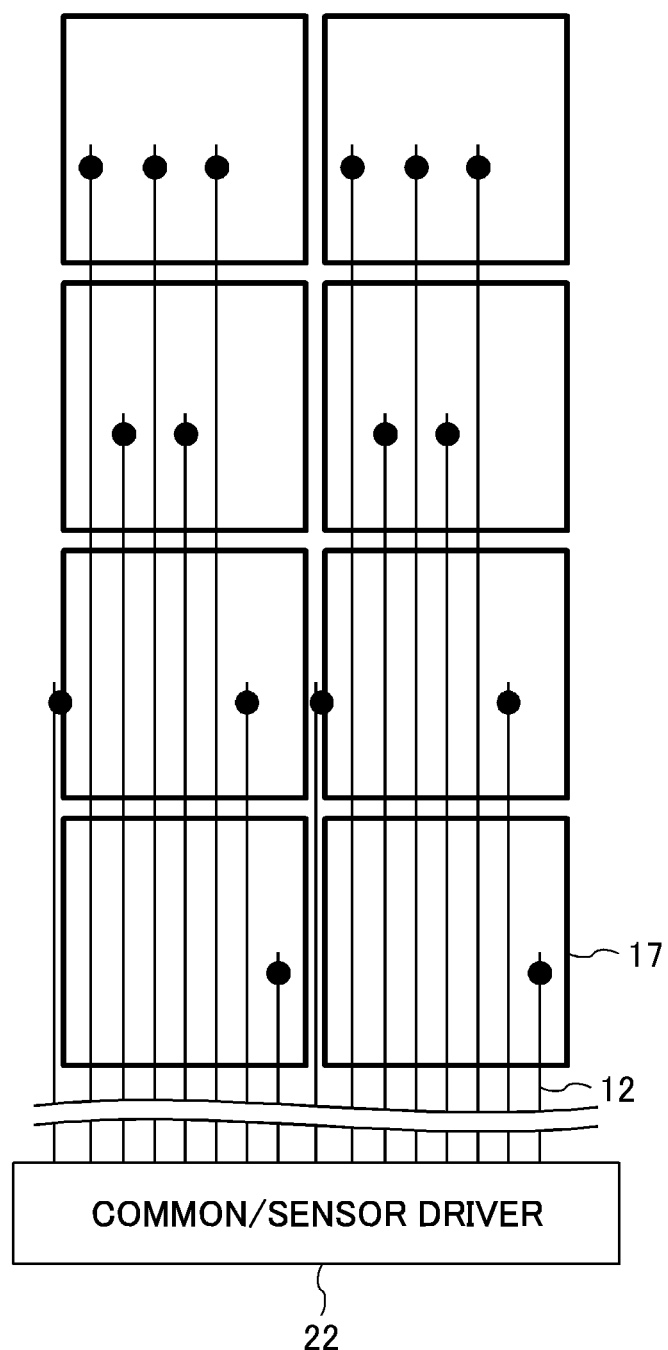
FIG. 26 is a plan view for illustrating a configuration of a display panel.
Figure 27:
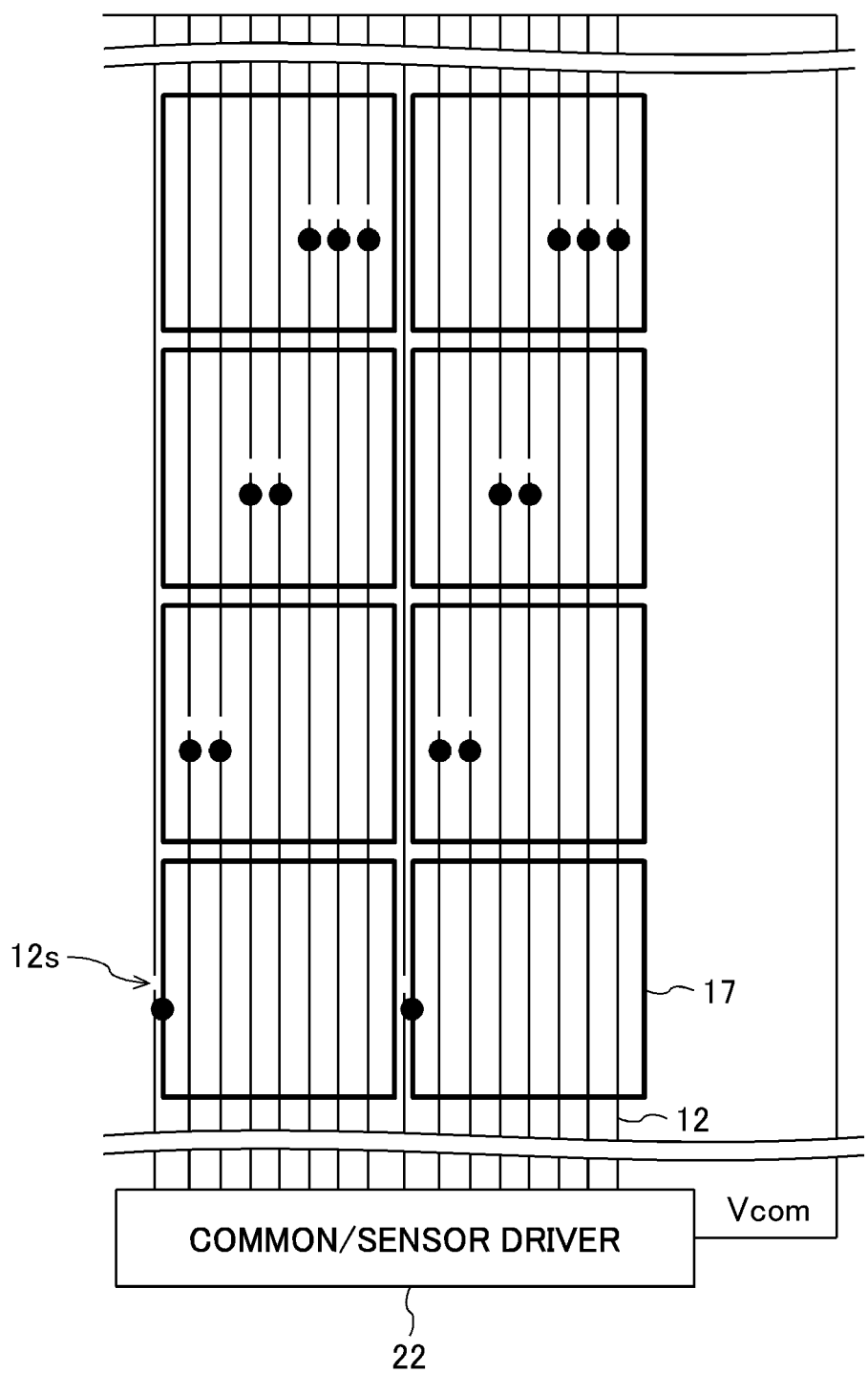
FIG. 27 is a plan view for illustrating a configuration of a display panel.
Figure 28:
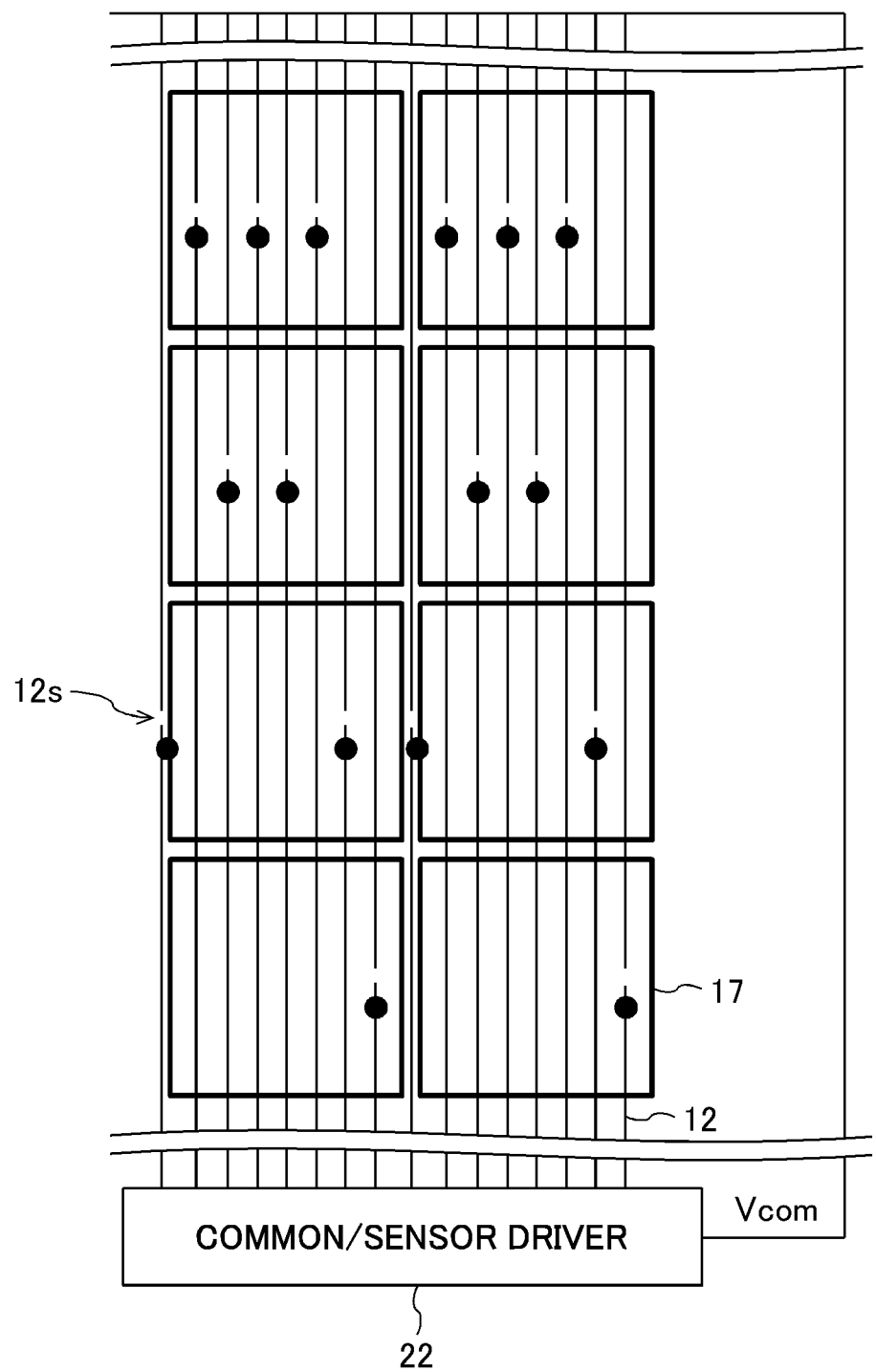
FIG. 28 is a plan view for illustrating a configuration of a display panel.

As illustrated in FIGS. 23 and 24, when the number of sensor electrode lines 12 to be electrically connected to a single common electrode 17 is increased in accordance with the distance from the common/sensor driver 22, the wiring resistance can be equalized among the respective common electrodes 17. Therefore, the length of the sensor electrode line 12 may differ in accordance with the place of the common electrode 17. Specifically, as illustrated in FIGS. 25 and 26, the length of the sensor electrode line 12 may be set to a length up to the connection point between the sensor electrode line 12 and the common electrode 17. Further, as illustrated in FIGS. 27 and 28, each sensor electrode line 12 may have a slit formed within a range from the connection point between the sensor electrode line 12 and the common electrode 17 to the terminal end of the sensor electrode line 12, so as to be electrically disconnected. Further, in the configurations illustrated in FIGS. 27 and 28, the terminal ends of the respective sensor electrode lines 12 may be connected to each other, and may be supplied with a predetermined voltage (for example, Vcom). With this, the potential of the wiring in a floating state can be fixed. Further, with the configurations of FIGS. 22 to 28, the display quality and the accuracy of the detection function of the touch position can be improved.

While there have been described what are at present considered to be certain embodiments of the application, it will be understood that various modifications may be made

What is claimed is:

1. A display panel comprising;
a glass substrate;
a plurality of gate signal lines extending in a first direction and formed on the glass substrate;
a plurality of data signal lines and a plurality of sensor electrode lines, which extend in a second direction different from the first direction;
a plurality of pixel electrodes arranged so as to respectively correspond to a plurality of pixels arrayed in the first direction and the second direction, the plurality of pixel electrodes being divided into a plurality of groups; and
a plurality of common electrodes arranged at a ratio of one to a plurality of pixel electrodes included in one of the plurality of groups, wherein:
each of the plurality of sensor electrode lines overlaps with corresponding one of the plurality of data signal lines in plan view;
each of the plurality of common electrodes has at least two overlapping portions spaced apart from each other, each of the overlapping portions overlapping a corresponding one of the plurality of sensor electrode lines in a plan view;
a first insulating film formed on the glass substrate and to cover the plurality of gate signal lines;
the plurality of data signal lines are formed on the first insulating film;
a second insulating film formed to cover the plurality of data signal lines;
a third insulating film formed on the second insulating film, wherein the third insulating film has a greater thickness than the second insulating film;
a plurality of adhesion layers formed on the third insulating film;
the plurality of sensor electrode lines formed on the plurality of adhesion layers;
a fourth insulating film formed to cover the third insulating film and the plurality of sensor electrode lines formed on the plurality of adhesion layers,
wherein a through hole is formed through a art of the fourth insulating film, and wherein the sensor electrode lines extend in the second direction and are formed at a position in which the sensor electrode lines overlap with the data signal line in clan view;
the plurality of common electrodes are formed on the fourth insulating film and inside the through hole to electrically connect one of the plurality of sensor electrode lines and corresponding one of the plurality of common electrodes to each other,
a fifth insulating film formed to cover the plurality of common electrodes, wherein the the plurality of pixel electrodes are formed on the fifth insulating film.

2. The display panel according to claim 1, wherein the plurality of common electrodes are arrayed at equal intervals in the first direction and the second direction.

3. The display panel according to claim 1, further comprising shielding wiring formed on the fifth insulating layer and arranged to cover a gap between adjacent two of the plurality of common electrodes in plan view.

4. The display panel according to claim 1, wherein the plurality of common electrodes are arranged so that a gap between adjacent two of the plurality of common electrodes overlaps with a gap between adjacent pixels in plan view.

5. The display panel according to claim 1, wherein the at least two overlapping portions of each of the plurality of common electrodes are neighboring to each other in the second direction.

6. The display panel according to claim 1, wherein the display panel detects a touch position by means of a self-capacitance method of a capacitive system.

7. The display panel according to claim 1, wherein a thickness of the third insulating film is greater than a thickness of the fifth insulating film.

8. The display panel according to claim 1, wherein the third insulating film is made of an organic material mainly containing acrylic.

* * * * *